US009181897B2

(12) United States Patent
Takada et al.

(10) Patent No.: US 9,181,897 B2
(45) Date of Patent: Nov. 10, 2015

(54) SLIDING MEMBER AND METHOD FOR PRODUCING SLIDING MEMBER

(75) Inventors: Ryotaro Takada, Tochigi (JP); Yoshitaka Tsujii, Tochigi (JP); Takahisa Tashiro, Tochigi (JP); Mayumi Saruyama, Tochigi (JP); Yuki Furukawa, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/009,387

(22) PCT Filed: Feb. 29, 2012

(86) PCT No.: PCT/JP2012/055082

§ 371 (c)(1),
(2), (4) Date: Oct. 2, 2013

(87) PCT Pub. No.: WO2012/137562

PCT Pub. Date: Oct. 11, 2012

(65) Prior Publication Data

US 2014/0014059 A1 Jan. 16, 2014

(30) Foreign Application Priority Data

| | | |
|---|---|---|
| Apr. 6, 2011 | (JP) | 2011-084394 |
| Apr. 6, 2011 | (JP) | 2011-084395 |
| Apr. 6, 2011 | (JP) | 2011-084396 |
| May 19, 2011 | (JP) | 2011-112141 |
| Dec. 28, 2011 | (JP) | 2011-287450 |

(51) Int. Cl.
*F02F 3/00* (2006.01)
*F16J 1/01* (2006.01)

(Continued)

(52) U.S. Cl.
CPC ............... *F02F 3/0084* (2013.01); *C23C 28/30* (2013.01); *F02F 3/10* (2013.01); *Y10T 428/12042* (2015.01); *Y10T 428/12049* (2015.01)

(58) Field of Classification Search
CPC .................................. F05C 2201/0421; F05C 2201/0475–2201/0484; F02F 3/10; F02F 3/00; F02F 3/084; Y10T 428/12049; Y10T 428/12042; C34C 28/30
USPC .......................................... 123/193.6; 92/223
See application file for complete search history.

(56) References Cited

U.S. PATENT DOCUMENTS 4,868,067 A * 9/1989 Fujisawa et al. .............. 428/614
5,740,788 A * 4/1998 Atmur et al. .................. 123/668

(Continued)

FOREIGN PATENT DOCUMENTS

CN 101809092 8/2010
JP 8-508324 9/1996

(Continued)

OTHER PUBLICATIONS

International Search Report dated Apr. 24, 2012.

(Continued)

*Primary Examiner* — Marguerite McMahon
(74) *Attorney, Agent, or Firm* — Rankin, Hill & Clark LLP

(57) ABSTRACT

A sliding member for which adhesiveness between the surface of a base member and metal coating is enhanced. An undercoat layer having a resin material at the surface thereof is provided, and a solid lubricating portion is formed on the undercoat layer so as to provide a sliding face from at least one kind of material of silver, silver alloy, copper and copper alloy. An intermixture layer in which both the undercoat layer and the solid lubricating portion are intermixed with each other is interposed between the undercoat layer and the solid lubricating portion.

18 Claims, 27 Drawing Sheets

(51) Int. Cl.
*C23C 28/00* (2006.01)
*F02F 3/10* (2006.01)

(56) References Cited

U.S. PATENT DOCUMENTS

| | | | | |
|---|---|---|---|---|
| 8,919,319 | B2 * | 12/2014 | Takada et al. | 123/193.6 |
| 2008/0060603 | A1 * | 3/2008 | Kuroda et al. | 123/193.6 |
| 2010/0236516 | A1 * | 9/2010 | Sasaki | 123/193.6 |
| 2010/0261625 | A1 | 10/2010 | Hakamata | |

FOREIGN PATENT DOCUMENTS

| | | | |
|---|---|---|---|
| JP | 2002-147460 | | 5/2002 |
| JP | 2005-305395 | | 11/2005 |
| JP | 2007-203125 | | 8/2007 |
| JP | 2011012767 | A * | 1/2011 |

OTHER PUBLICATIONS

Chinese Office Action dated Jul. 1, 2015.

* cited by examiner (1134/101850)×100=1.11[%]

(2196/103872) × 100=2. 11 [%]

SLIDING MEMBER AND METHOD FOR PRODUCING SLIDING MEMBER

TECHNICAL FIELD

The present invention relates to a sliding member which includes a base member and metallic coating provided on the surface of the base member to form a sliding face, and a method of producing the sliding member, and particularly to a technique of enhancing the adhesion between the base member and the metallic coating.

BACKGROUND ART

Reduction of emission of carbon dioxide ($CO_2$ gas) as greenhouse gases has been recently becoming a global problem, and the reduction of emission of carbon dioxide has been also strongly required to vehicles as emission sources of carbon dioxide. Therefore, the friction between a sliding member and a sliding target member as a partner member to the sliding member in a vehicle is reduced. For example, it has been proved that enhancement of fuel consumption, prevention of baking and prevention of occurrence of abnormal sounds can be performed by subjecting the sliding face of a piston (sliding member) of an internal combustion engine to a surface treatment.

As this type of surface treatment method has been proposed a method of impregnating a base member of aluminum (containing aluminum alloy) with chemical conversion treatment liquid containing etching liquid and water-soluble metallic salt (for example, silver) to conduct a surface roughening treatment on the surface of the aluminum base member with this etching liquid and substantially simultaneously form metallic coating on the surface of the aluminum base member with metal composing the water-soluble metallic salt (see Patent Document 1, for example).

PRIOR ART DOCUMENT

Patent Document

Patent Document 1: JP-A-2005-305395

SUMMARY OF THE INVENTION

Problem to be Solved by the Invention

However, the adhesion between the aluminum base member and the metallic coating is weak in the prior art described above, and thus the prior art has the following problem. For example, when the aluminum base member having the metallic coating formed thereon is actually used under a harsh environment such as a piston of an internal combustion engine or the like, peeling of the metallic coating occurs because the adhesion between the aluminum base member and the metallic coating is insufficient.

Furthermore, as a method of forming silver (metal) coating on the surface of the base member has been used an electroplating method of impregnating the aluminum base member with plating liquid of potassium silver cyanide and supplying current while the aluminum base member is used as a cathode, thereby forming silver coating on the surface of the base member. When coating is formed by using electroplating, a dedicated power supply device is generally necessary, so that the scale of the facilities is large and also a large amount of cost is required for a wastewater treatment because salt of cyan is used. Furthermore, when chemical conversion coating is formed on the aluminum base member, it contains a large amount of impurities, so that the purity of the coating decreases and the thermal conductivity of the coating also decreases. Therefore, there is a problem that the sliding characteristic of the coating deteriorates.

Therefore, the present invention has been implemented in view of the foregoing situation, and has an object to provide a sliding member for which the adhesion between the surface of a base member and metallic coating is enhanced with a simple construction, and a method of producing the sliding member. Furthermore, the present invention has another object to form sliding-optimum silver coating having high purity by a simple method, secure high adhesion and exclude use of harmful materials from a manufacturing process.

Means of Solving the Problem

In order to attain the above object, according to the present invention, a sliding member having a sliding face that slides in a sliding target member is characterized in that an undercoat layer containing a resin material is provided on the surface of a base member, a solid lubricating portion that is formed on the undercoat layer and constitutes the sliding face from at least one kind of material selected from the group consisting of silver, silver alloy, copper and copper alloy is provided, and an intermixture layer in which both the undercoat layer and the solid lubricating portion are intermixed with each other is interposed between the undercoat layer and the solid lubricating portion.

According to this construction, the intermixture layer in which both the undercoat layer and the solid lubricating portion are intermixed with each other is interposed between the undercoat layer and the solid lubricating portion. Therefore, the lower portion of the solid lubricating portion is kept to intrude in the upper end portion of the undercoat layer in the intermixture layer. Therefore, the so-called anchor effect is exerted between the undercoat layer and the solid lubricating portion, whereby the joint force between the solid lubricating portion and the undercoat layer is enhanced, and the solid lubricating portion is difficult to peel off or drop off from the undercoat layer.

In this construction, the porosity of the solid lubricating portion may be equal to 2% or less, and the thickness of the intermixture layer may be equal to 10 nm or more. According to this construction, the solid lubricating portion can be firmly joined to the undercoat layer.

Furthermore, the undercoat layer may further contain solid lubrication agent, and the blending ratio of the resin material and the solid lubrication agent may be set in the range from 1:9 to 9:1 in wt %. In addition to the resin material, the solid lubrication agent is further contained in the undercoat layer. Therefore, even when the solid lubricating portion drops off from the and thus the undercoat is exposed, the lubrication performance can be maintained by the solid lubrication agent contained in the undercoat layer. Furthermore, by setting the blending ratio of the resin material and the solid lubrication agent in the range from 1:9 to 9:1 in wt %, the intermixture layer can be easily formed between the undercoat layer and the solid lubricating portion, and the undercoat layer can be brought with sufficient lubrication performance.

Furthermore, the solid lubrication agent may be at least one kind of material selected from the group consisting of molybdenum disulfide, boron nitride and graphite. Furthermore, at least the solid lubricating portion may be configured in a linear shape or dot-like shape. The solid lubricating portion may be formed as a coating layer that covers the undercoat layer through the intermixture layer. Furthermore, the sliding member may be a piston for an internal combustion engine, the piston may have a skirt portion whose surface is flat and smooth, and the undercoat layer may be formed on the flat and smooth surface.

Still furthermore, according to the present invention, a method of manufacturing a sliding member by forming coating of silver, silver alloy, copper or copper alloy on a surface of a base material to form a sliding face is characterized by comprising: coating a resin material having a thermosetting property on the surface of the base member, coating on the resin material suspension solution containing fine particles of any one of silver, silver alloy, copper or copper alloy dispersed in polar solvent before the resin material is hardened, and heating the coated suspension solution, the resin material and the base member to harden the resin material, remove the polar solvent and fuse and weld the fine particles to one another on the surface of the resin material.

In this construction, before the resin material is hardened, vibration may be applied to the coated suspension solution and the resin material so that an intermixture layer in which both the fine particles and the resin material are intermixed with each other is formed between the suspension solution and the resin material. Furthermore, ultrasonic vibration may be applied to the suspension solution and the resin material.

Furthermore, according to the present invention, a method of manufacturing a sliding member by forming coating of silver, silver alloy, copper or copper alloy on the surface of a base material to form a sliding face is characterized by comprising: forming a resin layer on a surface of the base member, coating, on the resin layer, suspension solution in which fine particles of any one of silver, silver alloy, copper and copper alloy are dispersed in solvent for swells a surface of the resin layer, and heating the suspension solution, the resin layer and the base member while an intermixture layer in which the fine particles and the resin material are intermixed with each other is formed between the coated suspension solution and the resin layer, whereby the fine particles in the suspension solution are fused and welded to one another while the solvent is removed, thereby forming the sliding face.

The average particle diameter of the fine particles of any one of silver, silver alloy, copper and copper alloy to be dispersed in the solvent may be set in the range from 1 nm to 80 nm. The heating temperature for the heating may be set in the range from 160° C. to 240° C. Furthermore, the same type metal particles as the fine particles dispersed in the solvent may be dispersed in the resin material. The average particle diameter of the particles dispersed in the resin material may be set in the range from 4 μm to 30 μm.

Effect of the Invention

According to the present invention, the intermixture layer in which the undercoat layer and the solid lubricating portion are intermixed with each other is interposed between the undercoat layer and the solid lubricating portion. Therefore, in the intermixture layer, the lower end portion of the solid lubricating portion is kept to intrude in the upper end portion of the undercoat layer. Therefore, the so-called anchor effect appears between the undercoat and the solid lubricating portion, whereby the joint force between the solid lubricating portion and the undercoat layer can be enhanced, and the fixed lubricating portion is difficult to peel or drop from the undercoat layer.

MODES FOR CARRYING OUT THE INVENTION

Preferred embodiments of a piston for an internal combustion engine (hereinafter merely referred to as "piston") as a sliding member according to the present invention will be described in detail with reference to the accompanying drawings.

First Embodiment

Figure 1:
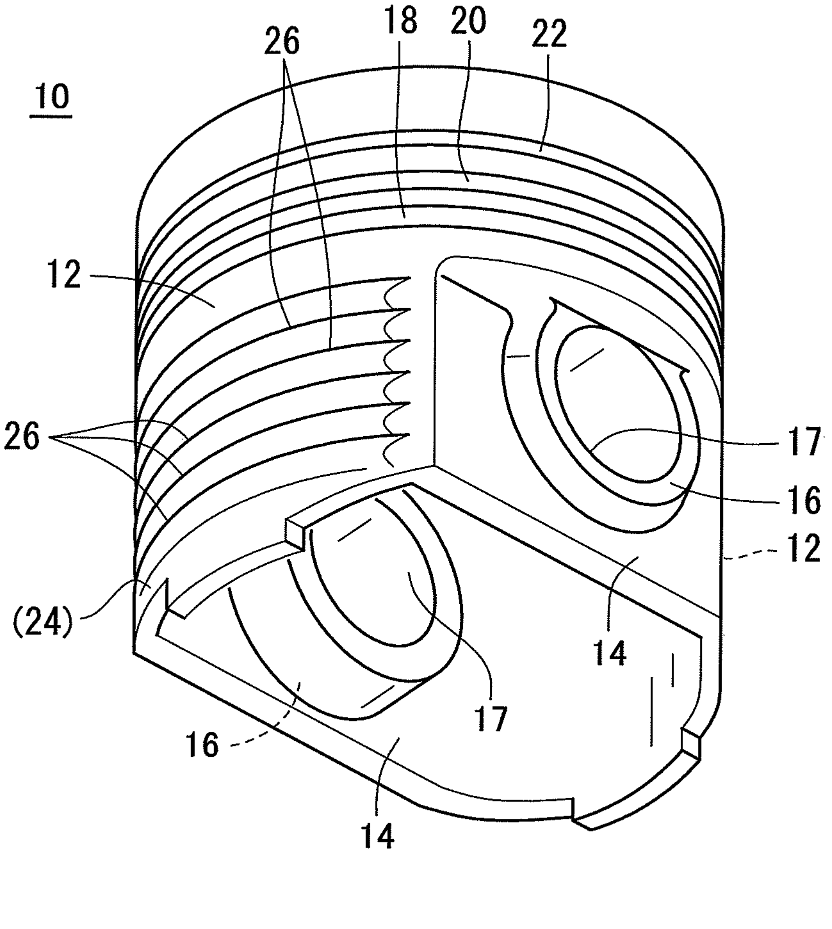
FIG. 1 is a perspective view showing the whole body of a piston according to a first embodiment of the present invention.
Figure 2:
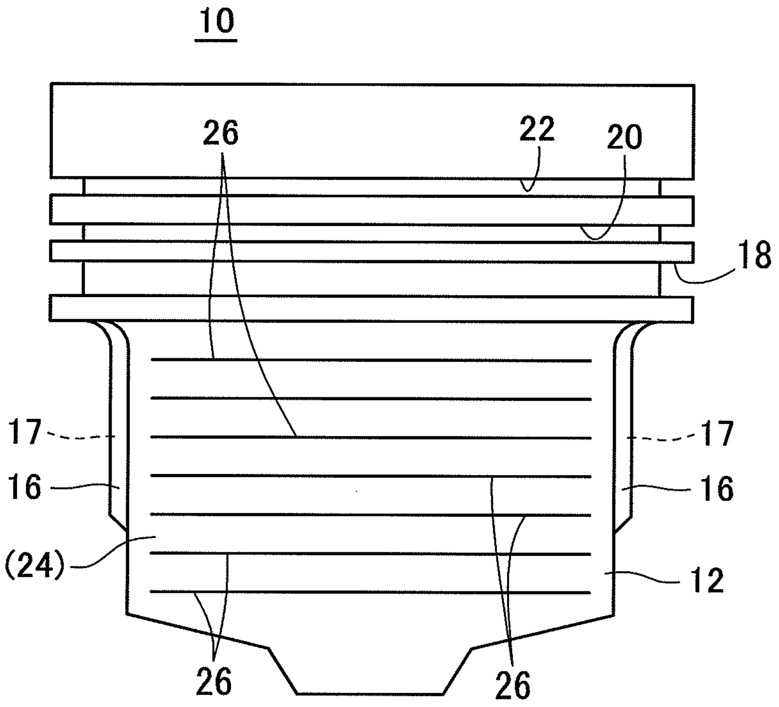
FIG. 2 is a side view showing the piston shown in FIG. 1.

FIG. 1 is a perspective view of the whole body of a piston 10 according to an embodiment of the present invention, and FIG. 2 is a side view of the piston. The piston (base member) 10 has a pair of piston skirts (skirt portions) 12, 12 at the lower portion thereof, and wall portions 14, 14 extending substantially in the vertical direction are interposed between the piston skirts 12, 12. Pin boss portions 16, 16 are respectively provided to the wall portions 14, 14 so as to project in the horizontal direction, and piston pin holes 17, 17 in which a piston pin (not shown) is inserted are formed in the respective pin boss portions 16, 16 so as to penetrate through the pin boss portions 16, 16. The piston pin is inserted in a through-hole formed at a small end portion of a connecting rod (con-rod) (not shown), whereby the con-rod is pivotally supported.

An oil ring groove 18, a first piston ring grove 20 and a second piston ring groove 22 are formed in this order in the direction from the lower side to the upper side above the piston skirts 12, 12. It is needless to say that the oil ring groove 18, the first piston ring groove 20 and the second piston ring 22 are formed so as to circumferentially go around the head portion of the piston 10.

The thus-constructed piston 10 is formed of AC2A, AC2B, AC4B, AC4C, AC4D, AC8H, A1100 (all are aluminum alloy defined in JIS) or aluminum alloy such as Al—Cu alloy or the like.

Figure 3:
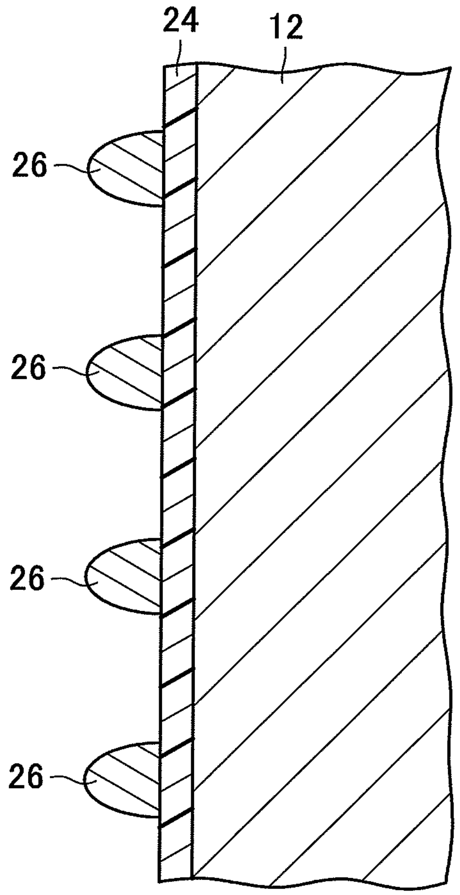
FIG. 3 is an enlarged cross-sectional view showing the neighborhood of a surface layer portion of a piston skirt constituting the piston.

As illustratively enlarged in FIG. 3, the sliding-contact surface (surface) of the piston skirt 12 is formed as a smooth face, and an undercoat layer 24 is firmly fixed to the smooth sliding-contact surface. The undercoat layer 24 is coated over the whole sliding-contact surface of the piston skirt 12, and the thickness of the undercoat layer 24 is substantially uniform.

The undercoat layer 24 enhances the adhesion between solid lubricating portions 26 described above and the piston skirt 12, and contains resin material having a heat resistance property. Polyimide resin, polyamide-imide resin, epoxy resin, nylon-6 resin, nylon-6, 6, resin or the like may be preferably used as this type of resin material.

The undercoat layer 24 may be formed of only resin material, but it may be further added with solid lubricating agent in addition to the resin material. Publicly known materials may be blended as the solid lubricating agent, and molybdenum disulfide ($MoS_2$) boron nitride (BN), graphite (C) or the like is preferably used as the solid lubricating agent.

When the undercoat layer 24 contains the solid lubricating agent, the blend ratio between the resin material and the solid lubricating agent may be set so that resin material:solid lubricating agent ranges from 1:9 to 9:1 in ratio by weight. When the weight ratio of the resin material is less than 1, it would be difficult to generate an eroded layer 28 (intermixture layer, see FIG. 4) described later. When the weight ratio of the solid lubricating agent is less than 1, the effect of enhancing the lubrication property by blending the solid lubricating agent would be insufficient.

Plural solid lubricating portions 26 extending linearly are provided along the circumferential direction of the piston skirt 12 on the undercoat layer 24 (see FIG. 1 and FIG. 2). Each solid lubricating portion 26 upheaves from the undercoat layer 24 along the horizontal direction. Therefore, streak shapes are formed by the plural solid lubricating portions 26 having linear shapes.

The solid lubricating portions 26 are formed of any one material out of silver, silver alloy, copper and copper alloy. These materials have excellent lubrication performance when the piston skirt 12 is in sliding-contact with the inner wall of the bore of a cylinder block or the inner wall of a cylinder sleeve. In this construction, the surfaces of the solid lubricating portions 26 function as sliding faces. Ag—Sn alloy or Ag—Cu alloy is preferably used as silver alloy, and Cu—Sn alloy, Cu—Zn alloy, Cu—P alloy or the like is preferably used as silver alloy.

When the solid lubricating portions 26 are formed of silver or silver alloy, the purity of silver is preferably equal to or more than 60 wt %. When the purity of silver is less than 60 wt %, the thermal conductivity of the solid lubricating portions 26 is slightly low, and it is not easy to form a smooth abrasive surface, so that the effect of reducing the friction loss (Psf) of the internal combustion engine trends to be insufficient. It is more preferable that the purity of silver is equal to or more than 80 wt %.

When the solid lubricating portions 26 are formed of copper or copper alloy, the purity of copper is preferable equal to or more than 70 wt % for the same reason, and more preferably equal to or more than 80 wt %.

Here, the purity of silver is defined as "the wt % of silver contained in the solid lubricating portions 26). For example, when the solid lubricating portions 26 formed of silver alloy are formed, the purity of silver is determined as the wt % of silver contained in the solid lubricating portion 26. The same is applied to the purity of copper.

It is not necessary that all the solid lubricating portions 26 are formed of the same metal. For example, one solid lubricating portion 26 may be formed of silver while another solid lubricating portion 26 adjacent to the former solid lubricating portion 26 is formed of a different kind of metal such as copper alloy or the like.

The thickness of the solid lubricating portion 26 is not limited to a specific one. However, when the thickness is excessively small, the solid lubricating portions 26 would be worn away in a relatively short time. On the other hand, when the thickness is excessively large, the weight of the solid lubricating portions 26 increases, resulting in increase of the driving force for reciprocating the piston 10. In order to avoid occurrence of the above disadvantage, the thickness of the solid lubricating portion 26 is preferably set in the range from 0.5 to 100 μm.

Figure 4:
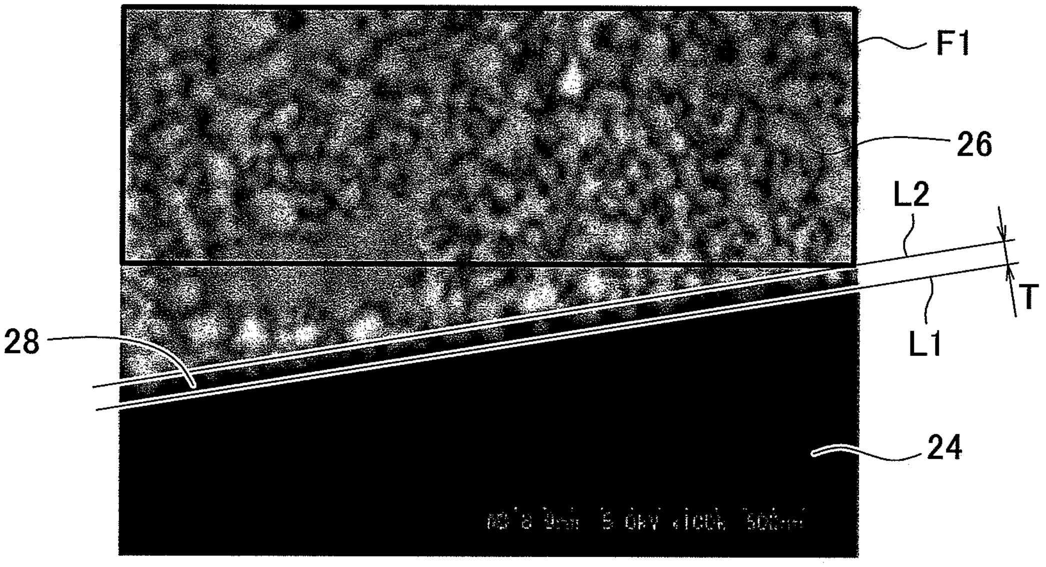
FIG. 4 is an SEM photograph obtained by imaging the neighborhood of the boundary between an undercoat layer and a solid lubricating portion laminated on a sliding-contact surface of the piston skirt.

Here, FIG. 4 shows an SEM photograph obtained by imaging the neighborhood of the boundary between the undercoat layer 24 and the solid lubricating portion 26 constructed as described above with a scanning electron microscope (SEM). As is apparent from FIG. 4, concave portions and convex portions exist so as to be mutually continuous with one another at the upper end portion of the undercoat layer 24 in an area between lines L1 and L2, and the lower end portion of the solid lubricating portion 26 is filled in the recess portions while the projecting portions are buried in the lower end portion of the solid lubricating portion 26.

That is, the area between the lines L1 and L2 functions as a intermixture layer in which both the material constituting the undercoat layer 24 and the material constituting the solid lubricating portion 26 are intermixed with each other. The intermixture layer corresponds to a state that the lower end portion of the solid lubricating portion 26 apparently erodes and intrudes into the upper end portion of the undercoat layer 24. Therefore, in the following description, the intermixture layer is referred to as "eroded layer" and represented by reference numeral 28.

In the eroded layer 28, a so-called anchor effect is exerted between the undercoat layer 24 and the solid lubricating portions 26. This is because the lower end portions of the solid lubricating portions 26 intrude into the upper end portion of the undercoat layer 24. Therefore, the solid lubricating portions 26 are firmly joined to the undercoat layer 24. In other words, the solid lubricating portions 26 are difficult to exfoliate or drop from the undercoat layer 24.

Parts of the lower end portions of the solid lubricating portion 26, which are most proximate to the flat portion of the undercoat layer 24, are located substantially at the same height, and the line L1 is a tangent line to the tip portions of these lower end portions of the solid lubricating portions 26. Furthermore, parts of the upper end portion of the undercoat layer 24, which are most proximate to the flat portion of the solid lubricating portions 26, are located substantially at the same height, and the line L2 is a tangent line to the tip portions of the upper portion of the undercoat layer 24. The lines L1 and L2 are substantially parallel to each other.

Figure 5:
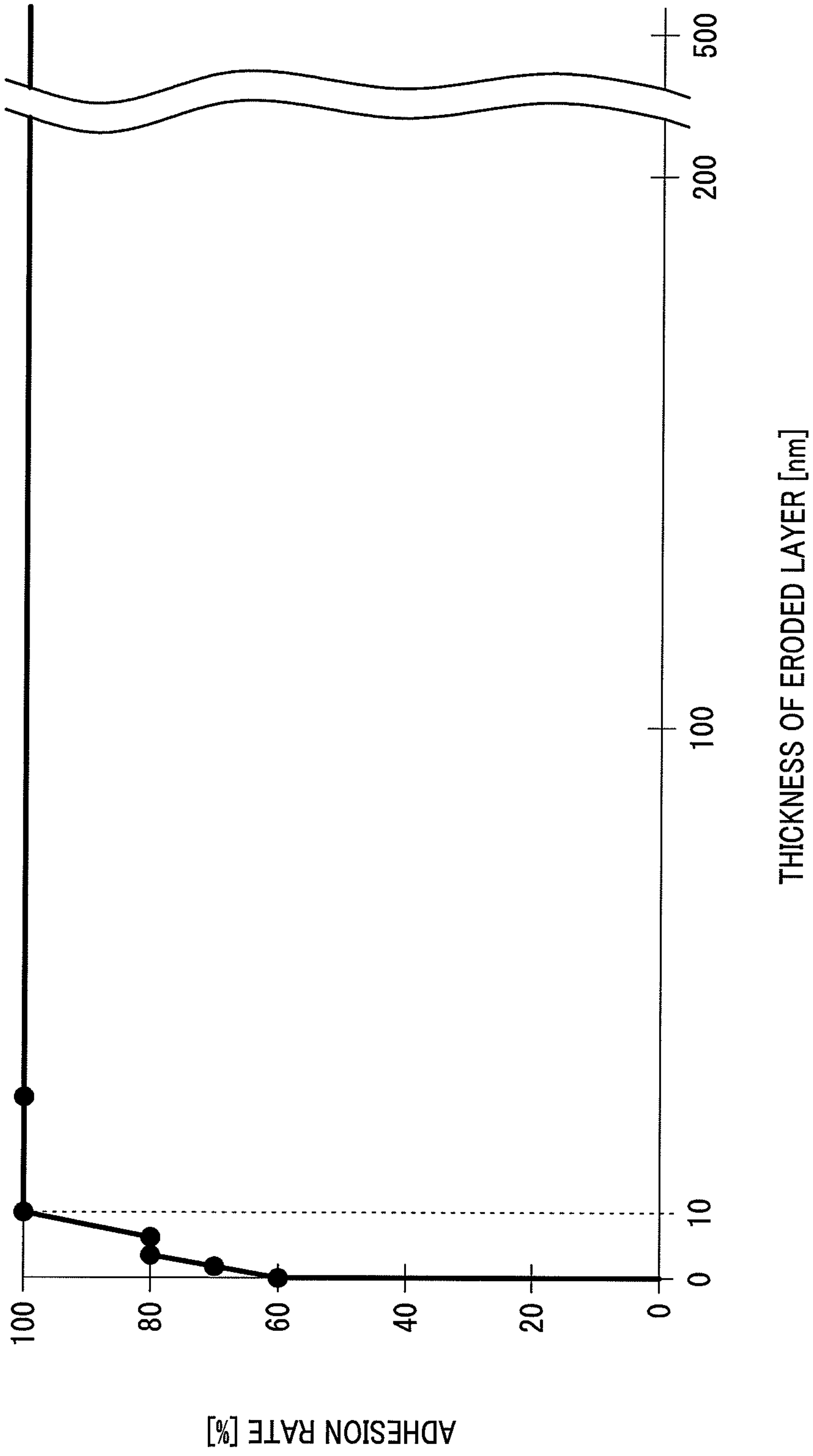
FIG. 5 is a graph showing the relationship between the thickness of an eroded layer shown in FIG. 4 and the adhesion rate of the solid lubricating portion.

The distance T between the lines L1 and L2 is defined as the thickness of the eroded layer 28 Here, FIG. 5 is a graph showing the relationship between the thickness of the eroded layer 28 and the adhesion rate of the solid lubricating portions 26. The adhesion rate represents a tumbling test result for plural test pieces. That is, an iron ball is made to impinge against the solid lubricating portion 26 under a predetermined condition, and then a tape is adhesively attached to the whole of the solid lubricating portion 26 and exfoliated therefrom. Then, the tape attachment amount of the solid lubricating portion 26 is binarized by using Photoshop (the name of software) produced by Adobe company to determine the area rate of the tape attachment amount of the solid lubricating portion 26. When the area rate is equal to 0%, the adhesion rate is defined as 100%. When the area rate is equal to 20%, 50% or 80%, the adhesion rate is equal to 80%, 50% or 20%.

Figure 6:
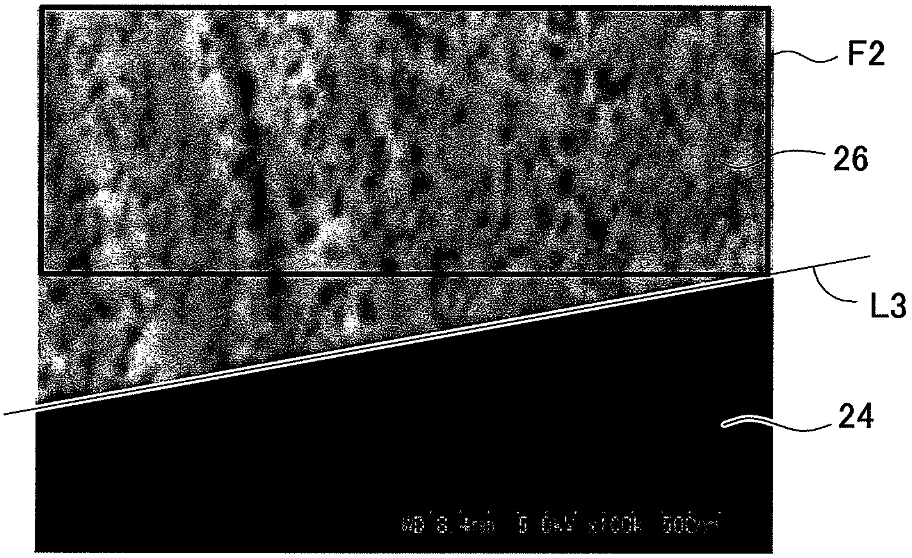
FIG. 6 is an SEM photograph of the neighborhood of the boundary between the undercoat layer and the solid lubricating portion when no eroded layer exists.

When a clear boundary line L3 appears between the undercoat layer 24 and the solid lubricating portion 26 as shown in FIG. 6 and no eroded layer 28 exists (that is, the thickness of the eroded layer 28 is equal to zero), the adhesion rate is equal to 60% as is apparent from FIG. 5. As the thickness of the eroded layer 28 increases, the adhesion rate also increases, and it reaches 100% when the thickness exceeds 10 nm.

The adhesion rate varies with the porosity of the solid lubricating portion 26. Here, in this embodiment, the porosity is determined by subjecting an SEM observation result of the solid lubricating portion 26 to image processing.

Figure 7:
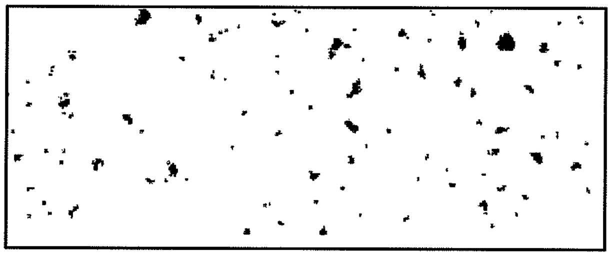
FIG. 7 shows an image obtained by executing image processing on the solid lubricating portion of FIG. 4.
Figure 8:
FIG. 8 shows an image obtained by executing image processing on the solid lubricating portion of FIG. 6.

Specifically, a portion of the solid lubricating portion 26 which is surrounded by each of rectangular frames F1, F2 in FIGS. 4 and 6 is binarized on the basis of the contrast thereof to obtain results shown in FIGS. 7 and 8. In FIG. 7, the relative value of the area at the white portion of the background is determined as 101850, and the total relative value of the area of freckling black portions (corresponding to pores) is determined as 1134. In this case, the porosity is calculated according to the following equation (1) and the calculation value thereof is equal to 1.11%.

$$(1134/101850)\times 100=1.11 \quad (1)$$

On the other hand, in FIG. 8, the relative value of the area of the white portion of the background is determined as 103872, and the total relative value of the area of the freckling black portions is determined as 2196. Therefore, the porosity is calculated according to the following equation (2), and the calculation value thereof is equal to 2.11%.

$$(2196/103872)\times 100=2.11 \quad (2)$$

The Photoshop (the name of software) produced by Adobe company may be used for image processing and binarization.

Figure 9:
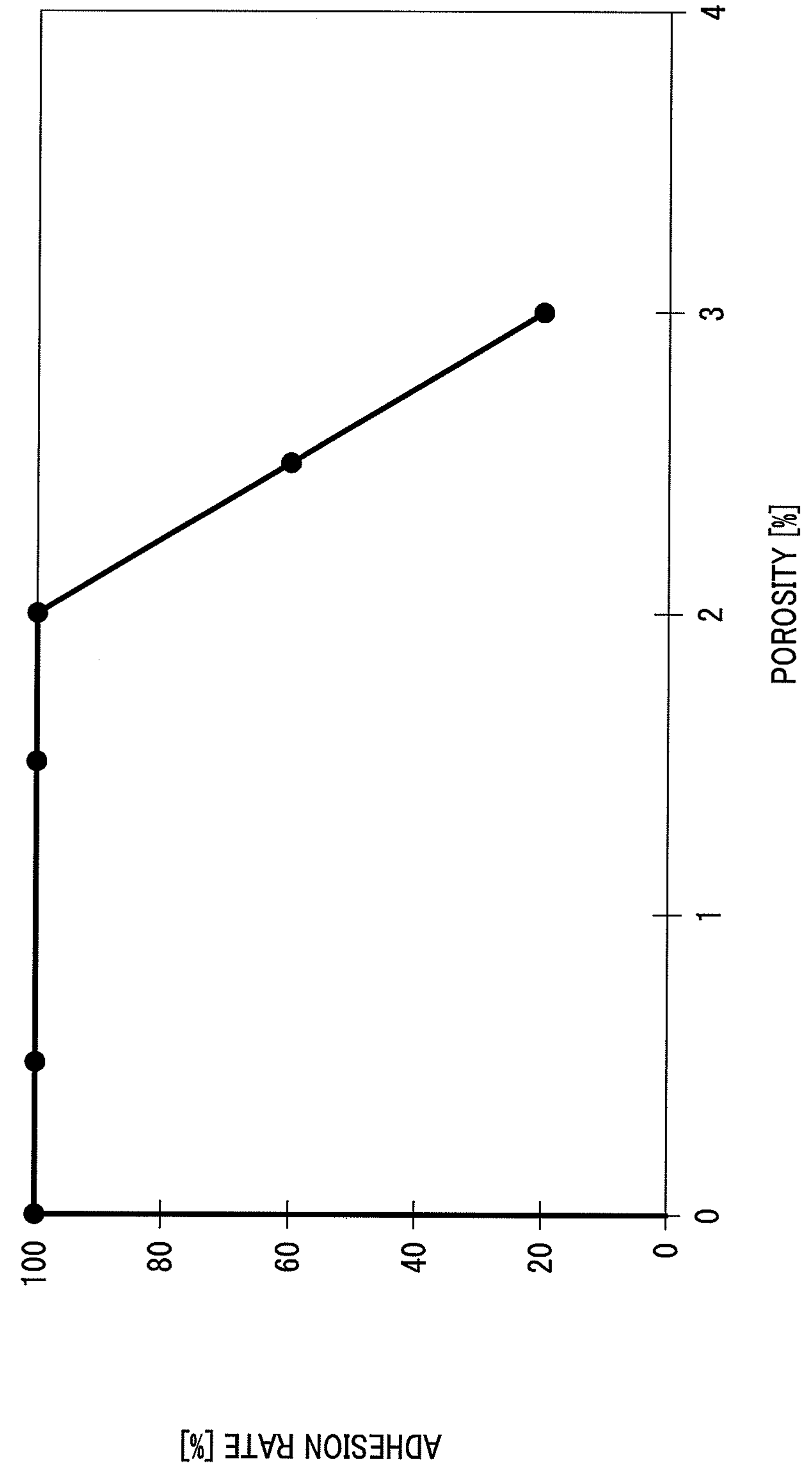
FIG. 9 is a graph showing the relationship between the porosity of the solid lubricating portion and the adhesion rate of the solid lubricating portion.

As shown in FIG. 9, when the porosity is not more than 2%, the adhesion rate is equal to 100%. When the porosity is more than 2%, the adhesion rate decreases. Accordingly, in this embodiment, the porosity of the solid lubricating portion 26 is set to be equal to or less than 2%.

As described above, by properly setting the thickness of the eroded layer 28 and the porosity of the solid lubricating portion 26, the solid lubricating portion 26 can be effectively prevented from exfoliating from the undercoat layer 24.

The thickness of the eroded layer 28 may be changed by selecting a proper material as dispersion medium used when the solid lubricating portion 26 is provided. The porosity of the solid lubricating portion 26 is varied according to the addition amount of dispersion agent.

When the internal combustion engine is assembled and operated, the lubricating portion 26 substantially comes into sliding-contact with (slides on) the inner wall of the cylinder (the inner wall of the cylinder bore or the inner wall of the cylinder sleeve) through lubrication oil. For example, when the solid lubricating portion 26 comes into sliding-contact with the inner wall of an FC (gray iron) sleeve or Al sleeve, the sum of the thermal conductivity of the solid lubricating portion 26 and the thermal conductivity of the FC sleeve or Al sleeve is equal to 350 W/m·K or more, and the absolute value of the difference in Young's module of the solid lubricating portion 26 from the FC sleeve or Al sleeve is equal to 10 GPa or more. According to enthusiastic consideration of the inventors of this application, the lubrication oil is excellently held in minute clearance between the sleeve and the piston skirt 12, and also occurrence of adhesion between the sleeve and the piston skirt 12 can be avoided. Therefore, occurrence of baking can be effectively avoided, and the friction loss of the internal combustion engine can be greatly reduced.

In addition, according to this embodiment, the solid lubricating portion 26 is firmly joined to the undercoat layer 24. This is because the porosity of the solid lubricating portion 26 is equal to a small value, that is, 2% or less, and also the eroded layer 28 of 10 nm or more in thickness exists between the solid lubricating portion 26 and the undercoat layer 24.

Therefore, the solid lubricating portion 26 is hard to exfoliate from the undercoat layer 24. In other words, the solid lubricating portion 26 is held on the sliding-contact surface of the piston skirt 12 for a long term. Therefore, the effect obtained by existence of the solid lubricating portion 26 in the piston 10 can be continued for a long term.

The solid lubricating portion 26 is difficult to exfoliate from the undercoat layer 24. Therefore, even when the piston 10 drastically reciprocates in the cylinder, the foregoing effect can be obtained under the action of the solid lubricating portion 26. That is, this embodiment can be supplied as an internal combustion engine having excellent durability for even a vehicle such as a racing car or the like which is driven under a harsh environment.

In addition, according to this embodiment, only plural linear solid lubricating portions 26 are provided. The solid lubrication agent and the resin materials as described above are cheap and light in weight. Therefore, even when the whole sliding-contact surface of the piston skirt 12 is coated with the undercoat layer 24 and the solid lubricating portions 26 are provided on the undercoat layer 24, the cost can be avoided from drastically increasing and the weight of the piston 10 can be avoided from excessively increasing.

As described above, the eroded layer 28 of 10 nm or more in thickness is interposed between the undercoat layer 24 and the solid lubricating portion 26 of 2% or less in porosity, and the linear solid lubricating portions 26 are provided at only a predetermined site of the undercoat layer 24, whereby a sufficient lubrication action can be exerted with reducing the cost and suppressing increase of the weight of the piston 10.

Furthermore, even when there occurs such a situation that the solid lubricating portion 26 drops from the undercoat layer 24 and the undercoat layer 24 comes into sliding-contact with the inner wall of the cylinder, the lubrication performance can be maintained by the solid lubrication agent when the solid lubrication agent is contained in the undercoat layer 24.

The undercoat layer 24 and the solid lubricating portion 26 may be provided to the sliding-contact surface of the piston skirt 12.

First, the resin material as described above is prepared for the undercoat layer 24, and melted. This molten material may be blended with the solid lubrication agent as described above. In this case, the blend is performed so as to satisfy the resin material:the solid lubrication agent=1:9 to 9:1 (weight ratio).

Next, the molten material is supplied onto the sliding-contact surface of the piston skirt 12. For this purpose, for example, injection may be performed. Or, the molten material may be coated. The molten material is preferably coated on the whole sliding-contact surface of the piston skirt 12. In this case, as compared with a case where the molten material is selectively coated on a part of the sliding-contact surface of the piston skirt 12, the work is easier and simpler. In other words, the undercoat layer 24 can be easily formed.

The thus-supplied molten material is cooled and solidified, whereby the undercoat layer 24 is formed on the sliding-contact surface of the piston skirt 12.

Furthermore, paste is prepared by dispersing, in dispersion medium, fine particles of silver, silver alloy, copper or copper alloy, preferably so-called nanoparticles of 1 to 80 nm, more preferably 30 to 80 nm in average particle diameter. This paste is added with dispersant.

Here, when terpineol which is frequently used as dispersion medium for ink used in ink jet print is used, a clear boundary line L3 appears between the undercoat layer 24 and the solid lubricating portion 26 as shown in FIG. 6, so that no eroded layer 28 is formed. As is apparent from this fact, proper dispersion medium is required to form the eroded layer 28.

Specifically, dispersion medium which makes the undercoat layer 24 swell sufficiently is selected. In this case, when paste for forming the solid lubricating portion 26 is coated on the undercoat layer 24, the undercoat layer 24 (resin material) swells under the action of the dispersion medium. In connection with this swelling, concave portions and convex portions are formed at the upper end portion of the undercoat layer 24, and the paste intrudes into the concave portions so as to be filled in the concave portions. As a result, the eroded layer 28 in which both the materials of the undercoat layer 24 and the paste are intermixed with each other is formed between the undercoat layer 24 and the paste.

Aromatic alcohol such as benzyl alcohol or the like may be used as a proper example of the dispersion medium having the action as described above. Or, propylene glycol monomethyl ether acetate which is called as PGMEA may be used.

In order to form the solid lubricating portion 26, the paste containing the dispersion medium as described above is coated on the undercoat layer 24 by a publicly known coating method such as screen printing, pad printing or the like, for example. Thereafter, the paste is heated together with the piston 10 at 160 to 240° C., for example, whereby the dispersion medium in the paste volatilizes and also the nanoparticles fuse with one another. That is, sintering occurs, and the solid lubricating portion 26 formed of the sintered material of the nanoparticles is obtained.

The porosity of the solid lubricating portion 26 varies with the addition amount of the dispersant in the paste. Accordingly, the addition amount of the dispersant is set so that the porosity of the solid lubricating portion 26 is equal to or less than 2%.

When nanoparticles are used, the nanoparticles can be sintered in a relatively low temperature range of 160 to 240° C. to form coating as described above. Accordingly, the piston skirt 12 formed of aluminum alloy is avoided from being kept at high temperature. Therefore, the mechanical strength, etc. of the piston skirt 12 can be avoided from being influenced.

The present invention is not limited to the above embodiment, and various modifications may be made without departing from the subject matter of the present invention.

Figure 10:
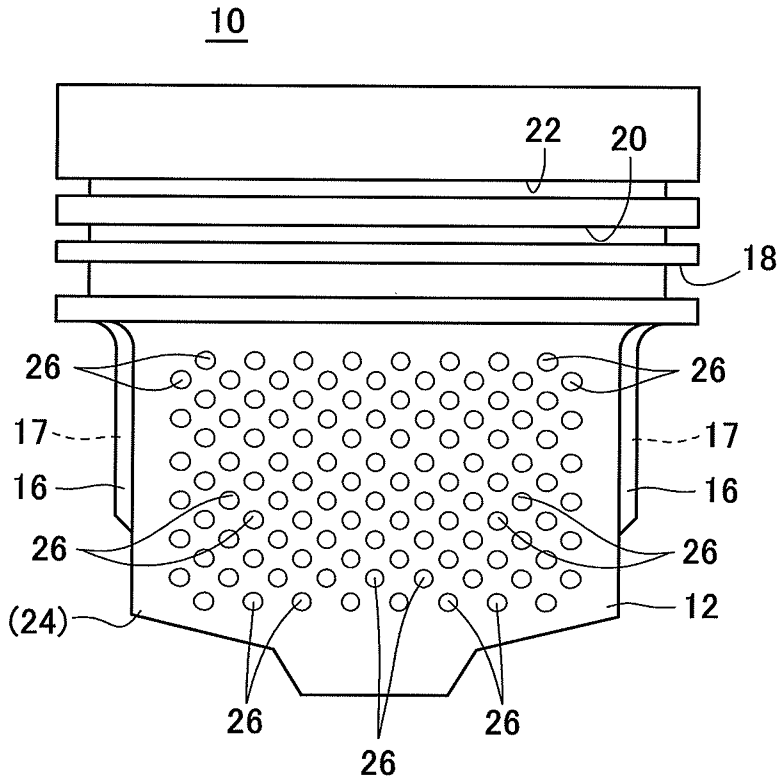
FIG. 10 is a side view showing a piston according to a modification.

For example, in the above embodiment, the solid lubrication portions 26 are designed in linear shape. However, they may be designed in dot-like shape as shown in FIG. 10. In this case, the concave portion formed between the dot-like solid lubricating portions 26, 26 serves to hold lubrication oil.

In this modification, the usage of the paste for forming the solid lubricating portions 26, and thus the usage of metal (silver, silver alloy, copper or copper alloy) is further reduced, so that the cost can be further reduced. Furthermore, the increment of the weight of the piston 10 can be suppressed.

Furthermore, the undercoat layer 24 may be selectively provided at only a place on the piston skirt 12 where the solid lubricating portion 26 is formed. Or, the whole sliding-contact surface of the piston skirt 12 may be coated with the undercoat layer 24 while the whole undercoat layer 24 is coated with the solid lubricating portion 26.

Figure 11:
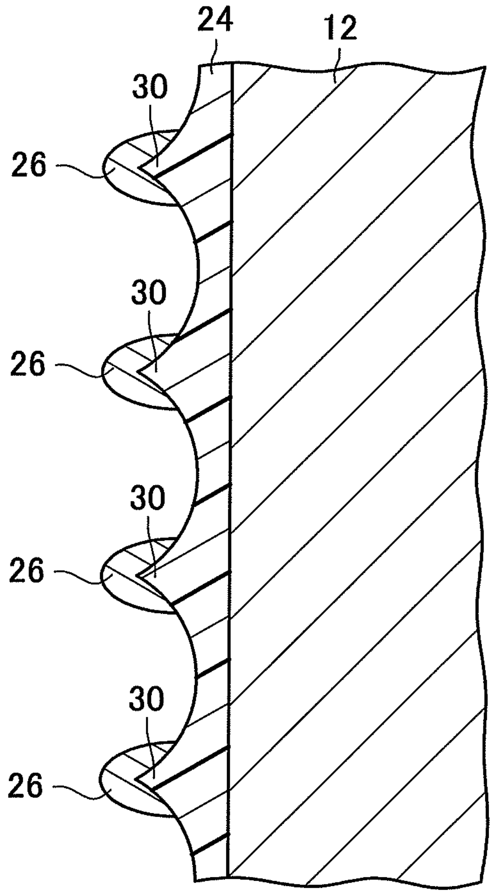
FIG. 11 is an enlarged cross-sectional view showing the neighborhood of the surface layer portion of a piston skirt constituting a piston according to another modification.

Furthermore, plural streaks are provided on the sliding-contact surface of the piston skirt 12, the undercoat layer 24 is selectively provided to the streaks, and the solid lubricating portion 26 is selectively provided on only the undercoat layer 24. Or, as shown in FIG. 11, projecting portions 30 are projectingly formed on the undercoat layer 24 so as to form plural lines going around the sliding-contact surface, and linear or dot-like solid lubricating portions 26 are provided on the projecting portions 30.

Second Embodiment

Figure 12:
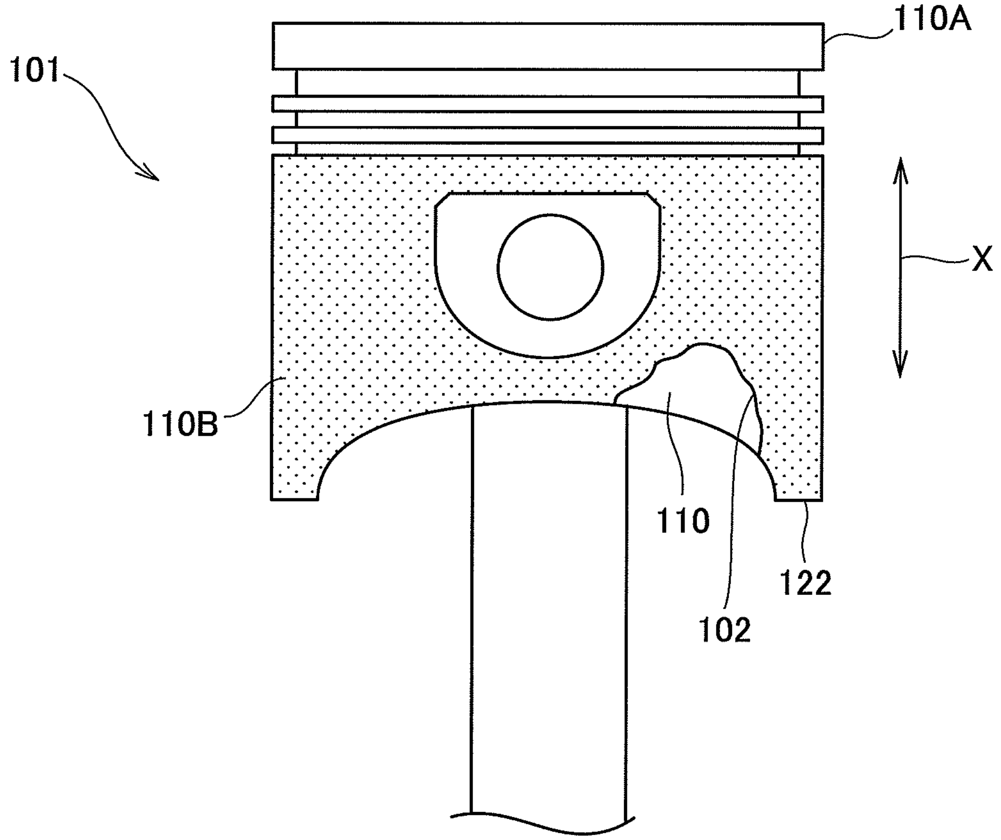
FIG. 12 is a side view showing a piston according to a second embodiment.
Figure 13:
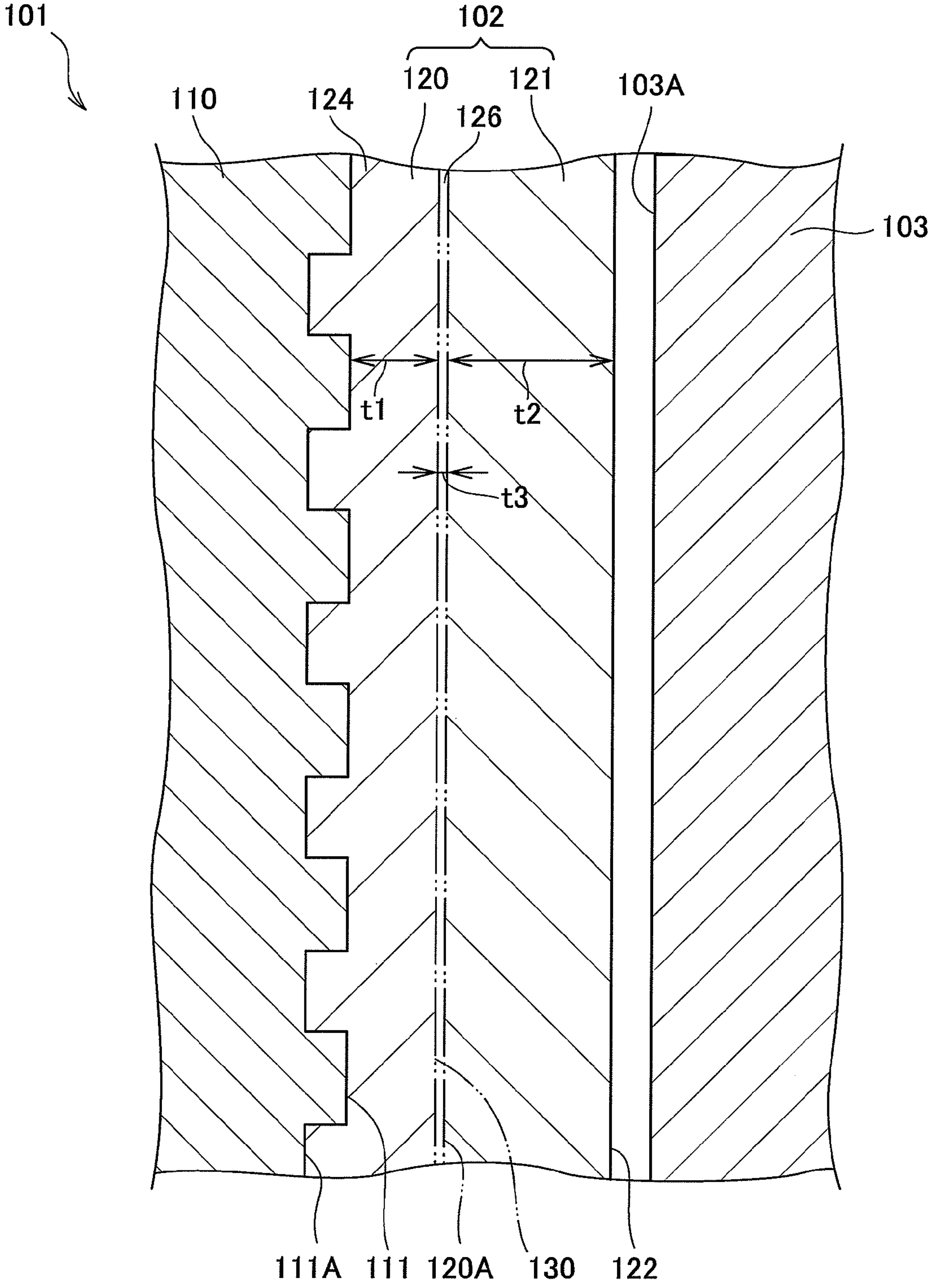
FIG. 13 is a side cross-sectional view showing a coating layer of the piston.

FIG. 12 is a side view showing a piston according to a second embodiment, and FIG. 13 is a side cross-sectional view showing a coating layer of the piston. In FIG. 12, the coating layer is illustrated as partially fracturing. In FIG. 13, a part of a cylinder bore in which the piston reciprocates is also illustrated.

The piston (sliding member) 101 has a main body (base member) 110 formed of aluminum alloy as shown in FIG. 12. The main body 110 has a land portion 110A and a skirt portion (piston skirt) 110B and is designed in a substantially cylindrical shape. A coating layer 102 is formed on the outer peripheral surface (surface) 111 of the main body 110 of the skirt portion 110B. As shown in FIG. 13, the coating layer 102 has a resin layer (undercoat layer) 120 which closely adheres to the outer peripheral surface 111 of the main body 110, and a silver coating layer (fixing lubricating portion) 121 which closely adheres to the outer peripheral surface (surface) 120A of the resin layer 120. A intermixture layer 126 in which silver of the silver coating layer 121 and resin material of the resin layer 120 exist while mutually physically mixed with each other is formed between the silver coating layer 121 and the resin layer 120. In the intermixture layer 126, silver and the resin material do not chemically bond to each other, but the outer peripheral surface 120A of the resin layer 120 is swelled or the like so as to form a concave-convex portion on the outer peripheral surface 120A, and silver is made to intrude into the concave-convex portion, thereby producing an anchor effect.

The silver coating layer 121 forms a sliding face 122 which slides on the inner wall 103A of a cylinder bore 103 of cast iron as a sliding target member, and when the piston 101 (skirt portion 110B) moves in the direction of an arrow X, the sliding face 122 comes into sliding-contact with (slides on) the inner wall 103A of the cylinder bore 103 through lubrication oil (not shown).

Silver is metal which is generally soft in hardness and has excellent thermal conductivity. Therefore, when the silver coating layer 121 is formed as the sliding face 122 of the piston 101, the silver coating layer 121 is easily worn away (initially abraded) and deformed when the silver coating layer 121 comes into sliding-contact with the inner wall 103A of the cylinder bore 103 under initial motion, and thus the sliding face 122 which is reduced in friction to the inner wall 103A and excellent in sliding characteristic can be easily implemented. Furthermore, heat transferred to the silver coating layer 121 can be promptly discharged to the outside through the lubrication oil, thereby enhancing the cooling efficiency of the main body 110. FIG. 13 schematically shows the coating layer 102, and does not represent the relative relationship between the thickness of each of the resin layer 120, the silver coating layer 121 and the intermixture layer 126 and the size (depth) of the concave portions 111A.

Minute concave portions 111A are formed on the outer peripheral surface 111 of the main body 110 (skirt portion 110B). Specifically, the concave portions 111A are formed by a short blast method with which projection members whose particle diameters are set to a predetermined particle diameter (for example, 10 μm) are projected to the outer peripheral surface 111 with compressed air or the like. These concave portions 111A serve to increase the contact area between the outer peripheral surface ill of the main body 110 and the resin layer 120. Accordingly, when the resin layer 120 is formed on the outer peripheral surface 111 of the main body 110, the resin layer 120 intrudes into the concave portions 111A, and the so-called anchor effect exerts, whereby the adhesiveness between the main body 110 and the resin layer 120 can be enhanced.

The main body 110 is subjected to ultrasonic cleaning for a predetermined time (10 minutes) while immersed in acetone solution, thereby removing oil and fat content adhering to the outer peripheral surface 111, and then the resin layer 120 is formed on the outer peripheral surface 111. Furthermore, in this construction, it is preferable to remove at least a part of oxide film formed on the outer peripheral surface 111 before the resin layer 120 is formed. Accordingly, a newly-formed surface of aluminum alloy is formed on the outer peripheral surface 111 of the main body 110, so that the adhesion between the newly-formed surface and the resin layer 120 is enhanced.

The resin layer 120 is formed of polyamide imide (PAI: Polyamide Imide) resin 124 which is thermosetting resin material having excellent heat resistance, and the polyamide imide is coated on the outer peripheral surface 111 of the main body 110 and hardened, thereby forming the resin layer 120. The resin layer 120 functions as an intermediate joint layer for making the main body 110 of the piston 101 as the base member and the silver coating layer 121 as the sliding face 122 closely adhere to each other. The thickness t1 of the resin layer 120 is set to 1 μm to 6 μm. The thickness t1 is set in this range because when the thickness t1 of the resin layer 120 is larger than 6 μm, crack or the like is liable to occur in the resin layer 120 due to shrinkage of the resin layer 120 which is caused by temperature variation.

In this embodiment, polyamide imide resin is used as the resin material, but the resin material is not limited to this material. Polyimide as the same type imide-based resin, epoxy as epoxy-based resin, or nylon 6, nylon 6, 6 as nylon-based resin may be used.

Figure 14:
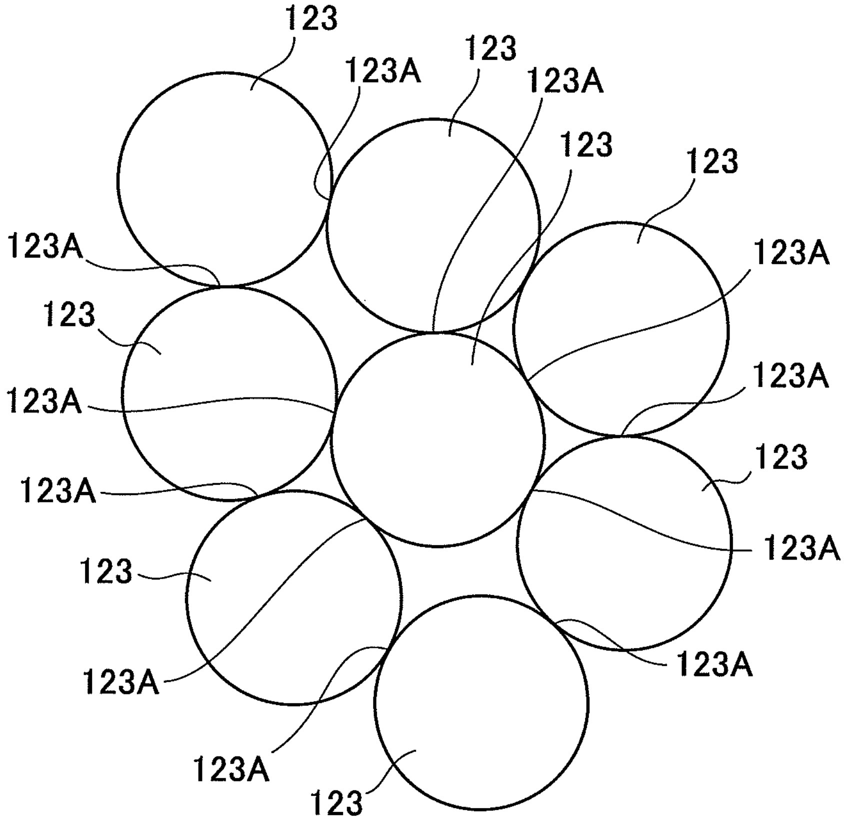
FIG. 14 is a schematic diagram showing silver particles dispersed in slurry.
Figure 15:
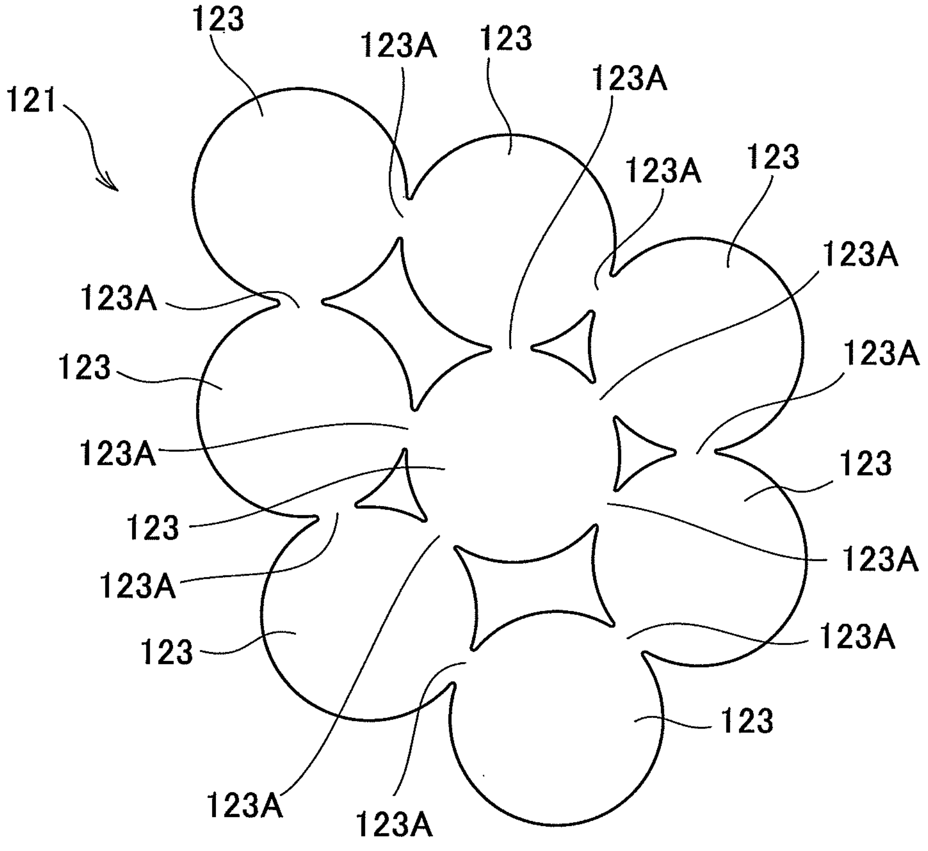
FIG. 15 is a schematic diagram showing a silver coating layer formed through fusion of silver particles.

Under this state, the resin layer 120 and the main body 110 are heated so that N-methyl-pyrrolidone in slurry is vaporized and also silver particles in the slurry are fused and welded. Specifically, as shown in FIG. 14, the silver particles 123 in the slurry exist under the state that they come into contact with one another at contact points 123A. When this slurry is heated, the silver particles 123 are fused and welded at the contact points 123A and integrated with one another, thereby forming the silver coating layer 121.

In the intermixture layer 126, the silver particles 123 existing while mixed with the polyamide imide resin 124 are fused together with the silver particles 123 in the slurry, whereby the silver coating layer 121 is formed. Accordingly, silver intruding into the intermixture layer 126 brings the so-called anchor effect, and enhances the adhesion between the silver coating layer 121 and the resin layer 120. The thickness T3 (FIG. 13) of the intermixture layer 126 formed between the silver coating layer 121 and the resin layer 120 is adjusted to 0.4 μm to 1 μm.

In this embodiment, the silver coating layer 121 is formed by using silver particles 123. However, silver alloy, copper or copper alloy may be used as fine particles whose average particle diameter is adjusted to the above nano-size level as described above.

Next, a heating temperature condition when the silver coating layer 121 will be described.

Figure 16:
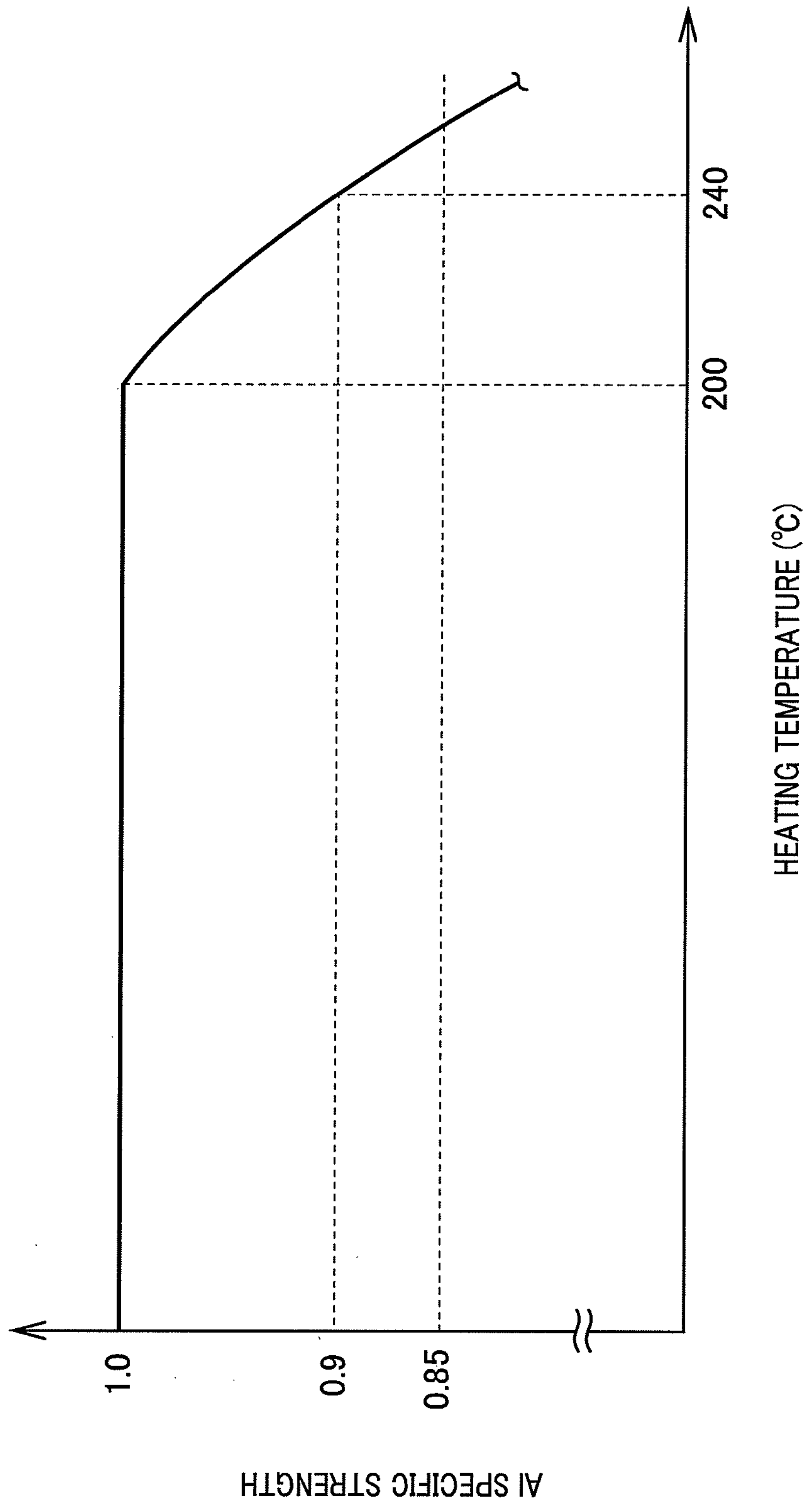
FIG. 16 is a graph showing the relationship between the specific strength of aluminum alloy and heating temperature.

FIG. 16 is a graph showing the relationship between the specific strength of aluminum alloy and the heating temperature. FIG. 16 shows variation of the specific strength in the range of 200° C. or more when the specific strength (the strength per unit weight) of aluminum alloy from 0 to 200° C. is set to 1.0. The strength of aluminum alloy is calculated on the basis of Rockwell hardness test.

It has been found that the specific strength (the strength per unit weight) of aluminum alloy forming the main body 110 trends to decrease as the heating temperature increases. Specifically, as shown in FIG. 16, there is a tendency that the specific strength transitions with being kept to 1.0 in the range from 0 to 200° C., but it gradually decreases when the heating temperature is equal to 200° C. or more. In general, under a harsh environment such as a piston of an internal combustion engine or the like, the minimum strength is required to aluminum alloy serving as the base member. Therefore, the applicant has settled the lower limit value of the specific strength of aluminum alloy according to his/her company's standards when the aluminum alloy is used for a piston or the like, and this lower limit value is set to 0.85 under the condition that the specific strength in the range from 0 to 200° C. is set to 1.0. Accordingly, in this embodiment, the heating temperature of aluminum alloy is set to not more than 240° C. which corresponds to the specific strength of 0.9 larger than the lowest limit value of 0.85 of the specific strength.

Figure 17:
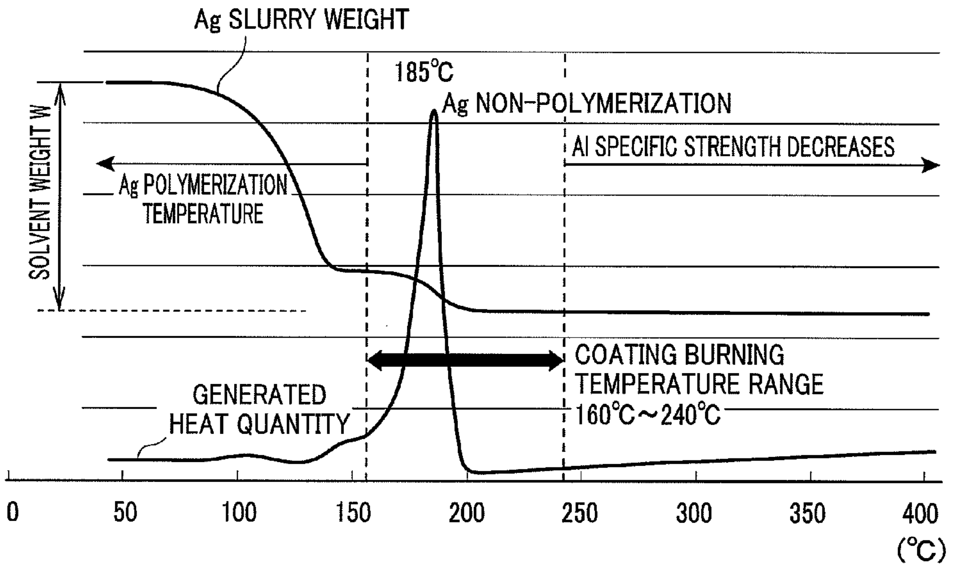
FIG. 17 is a graph showing variation of slurry weight and generated heat quantity with respect to variation of the heating temperature of slurry containing silver particles.

FIG. 17 is a graph showing variation of the slurry weight and the generated heat quantity with respect to variation of the heating temperature of slurry containing silver particles. As shown in FIG. 17, the generated heat quantity of the slurry increases in the range between 160° C. and 200° C. while it has a peak at 185° C. This represents that reaction heat caused by fusion and welding (polymerization) of silver particles in slurry occurs. In other words, the silver coating layer 121 can be formed by fusing and welding the silver particles in the slurry.

Therefore, in this construction, the heating temperature is set within the range from 160° C. to 240° C., more preferably within the range from 160° C. to 200° C., whereby the silver particles which are adjusted to nano size can be thermally fused and welded to one another without reducing the specific strength of the base member.

Furthermore, according to this embodiment, polyamide imide resin is used as the resin material, and thermosetting of this polyamide imide resin is completed within the time in which the silver particles are heated in the range from 160° C. to 200° C. to be fused and welded to one another. Accordingly, in this construction, a step of coating, on liquid resin material, slurry in which silver particles are dispersed and then heating them to harden the resin material, thereby forming the resin layer 120, and a step of forming (baking) the silver coating layer 121 on the outer peripheral surface 120A of the resin layer 120 can be performed by a single step. Therefore, the manufacturing process and the manufacturing time can be shortened.

The weight of the slurry starts to decrease at the heating temperature of about 80° C., and the decrease degree thereof moderates in the neighborhood of 140° C. However, the weight of the slurry further decreases in the neighborhood of 180° C. again, and becomes nearly flat in the neighborhood of 200° C. This decrease amount corresponds to the solvent weight W of N-methyl-pyrrolidone as solvent, and it is desired that almost all of solvent vaporizes when the heating temperature is set to 200° C. Furthermore, in this construction, the slurry is coated on the resin layer 120 at normal temperature, and thus it is also desired that the solvent is difficult to vaporize under normal temperature. In this embodiment, N-methyl-pyrrolidone is used as solvent, and the weight variation at normal temperature is little as shown in FIG. 17. Therefore, it is rare that the solvent in the slurry vaporizes and thus viscosity and concentration of the slurry varies in the coating step. Accordingly, coating having stable quality can be conducted. Furthermore, almost all of N-methyl-pyrrolidone vaporizes under the state that it is heated to 200° C., and thus the rate of silver in the silver coating layer 121 can be increased.

In this embodiment, N-methyl-pyrrolidone as pyrrolidone-based solvent is used as solvent, but the present invention is not limited to this material. Polyvinylpyrrolidone as the same pyrrolidone-based solvent, or chlorine-based solvent such as trichlorethylene, carbon tetrachloride or the like or acetone solvent as other solvents which swell imide-based resin, epoxy-based resin or nylon-based resin may be used.

Next, the particle diameter of silver particles in slurry will be described.

Figure 18:
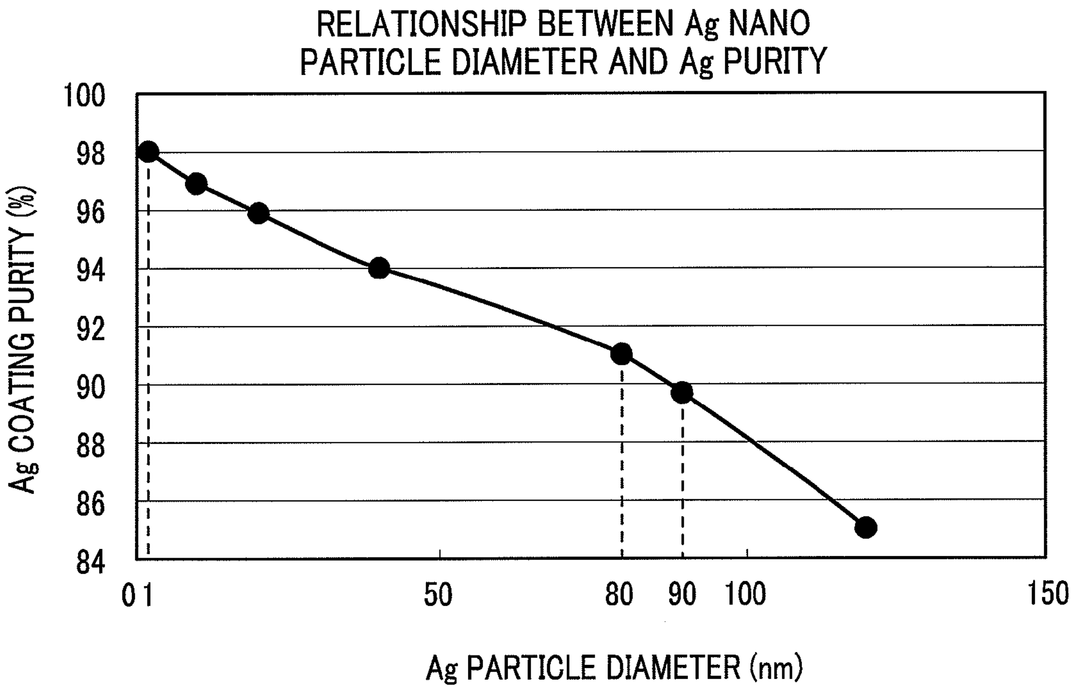
FIG. 18 is a graph showing the relationship between silver particle diameter and silver purity.

FIG. 18 is a graph showing the relationship between the silver particle diameter and the silver purity. Here, the silver purity is defined as the volume ratio of silver metal existing in the silver coating layer 121 per unit volume. As described above, the silver coating layer 121 is formed by heating the silver particles 123 so that the silver particles 123 are fused and welded to one another. Therefore, when the average particle diameter of the silver particles 123 increases, there is a tendency that voids among the silver particles 123 enlarge and thus the silver purity decreases as shown in FIG. 18.

When the silver purity decreases, the thermal conductivity of the silver coating layer 121 decreases, and the sliding performance deteriorates. Therefore, in order to secure predetermined thermal conductivity suitable for sliding, the silver purity is required to be equal to a predetermined threshold value (silver purity of 90%) or more. In this embodiment, the average particle diameter of the silver particles 123 is set within the range from 1 nm to 80 nm. Therefore, even when the average particle diameter is set to the maximum average particle diameter of 80 nm, the silver purity in the silver coating layer 121 can be kept to the predetermined reference value or more which is suitable for sliding, and the piston 101 having high thermal conductivity can be formed.

Furthermore, as shown in FIG. 13, the thickness t2 of the silver coating layer 121 is set in the range from 1 μm to 20 μm. It is difficult in the screen printing method to make the thickness t2 of the silver coating layer 121 smaller than 1 μm. In addition, when the thickness t2 is smaller than 1 μm, the main body 110 or the resin layer 120 is exposed, and thus the sliding face 122 cannot be flatly and smoothly formed. On the other hand, even when the thickness t2 of the silver coating layer 121 is set to be larger than 20 μm, the processing cost merely increases, and no great variation is found in sliding characteristic. Furthermore, it has been also found that sufficiently small friction can be implemented by setting the thickness t2 of the silver coating layer 121 in the above range. Accordingly, in this embodiment, the thickness t2 of the silver coating layer 121 is set in the range from 1 μm to 20 μm, whereby the piston 101 having the sliding face 122 whose friction is reduced by the silver coating layer 121 can be formed with an inexpensive construction.

Figure 19:
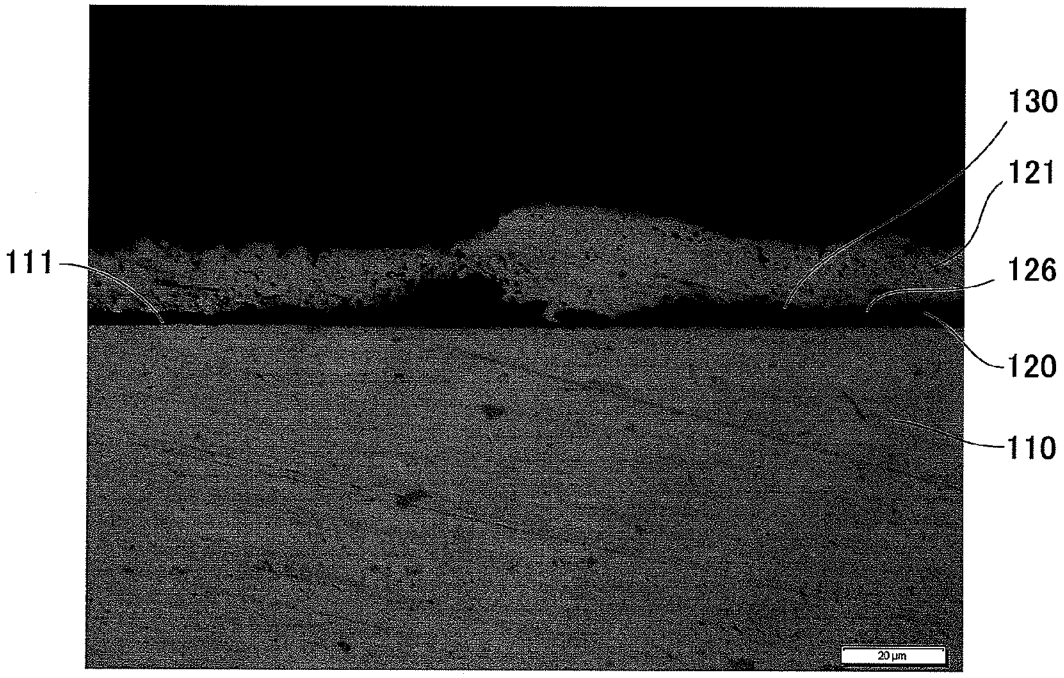
FIG. 19 is an electron microgram showing the coating layer of the piston.

FIG. 19 is an electron microscope photograph showing an enlarged cross-section of the piston 101 manufactured by the manufacturing method described above. In FIG. 19, the main body 110 is located at the lower side, and the resin layer 120 and the silver coating layer 121 are laminated on the outer peripheral surface (the upper surface in FIG. 19) 111 of the main body 110. Concavity and convexity are intricately formed at the interface 130 between the resin layer 120 and the silver coating layer 121 as shown in FIG. 19, the resin material and silver are mutually mixed with each other and the intermixture layer 126 is formed at this portion. In the intermixture layer 126, the resin material and silver are intricately engaged with each other, so that the so-called anchor effect is produced and the adhesion between the silver coating layer 121 and the resin layer 120 is enhanced.

As described above, according to this embodiment, in a method of manufacturing a piston 101 by forming silver coating on the outer peripheral surface 111 of a main body 110 formed of aluminum alloy to form a sliding face 122, a resin layer 120 is formed on the outer peripheral surface 111 of the main body 110 by using polyamide imide resin, coating on the resin layer 120 slurry having silver particles 123 dispersed in N-methyl-pyrrolidone for swelling the surface of the resin layer 120, and heating the slurry, the resin layer 120 and the main body 110 while a intermixture layer 126 in which silver particles 123 and polyamide imide resin are mutually mixed with each other is formed at the interface 130 between the coated slurry and the resin layer 120, whereby the silver particles 123 in the slurry are fused and welded to one another while N-methyl-pyrrolidone is removed, thereby forming the sliding face 122. Therefore, the silver coating layer 121 and the main body 110 are joined to each other through the resin layer 120. Therefore, the adhesion stress can be enhanced by using no harsh material in the manufacturing process, and the piston 101 on which the silver coating layer 121 having excellent mechanical strength is coated can be simply formed.

Furthermore, according to this embodiment, the N-methyl-pyrrolidone swells the outer peripheral surface 120A of the resin layer 120, whereby the intermixture layer 126 in which silver and polyamide imide resin are intermixed with each other is formed at the interface between the slurry and the resin layer 120, and the silver coating layer 121 and the resin layer 120 closely adhere to each other through the intermixture layer 126, so that the adhesion between the silver coating layer 121 and the resin layer 120 can be enhanced.

Furthermore, according to this embodiment, the average particle of the silver particles 123 dispersed in N-methylpyrrolidone is set in the range between 1 nm and 80 nm. Therefore, even when the particle size is set to the maximum average particle size of 80 nm, the purity of silver in the silver coating layer 121 can be kept to be not less than a predetermined reference value suitable for sliding, and the piston 101 having high thermal conductivity can be formed.

Still furthermore, according to this embodiment, the heating temperature when heating is performed is set in the range between 160° C. and 240° C. Therefore, the silver particles can be thermally fused and welded to one another without reducing the specific strength of the main body 110, thereby forming the silver coating layer 121.

Still furthermore, according to this embodiment, concavity and convexity are formed on at least a part of the outer peripheral surface 111 of the main body 110 before the resin layer 120 is formed. Therefore, the contact area between the outer peripheral surface 111 of the main body 110 and the resin layer 120 can be increased. In addition, the resin layer 120 intrudes into the concave portions 111A to exert the so-called anchor effect, so that the adhesion between the main body 110 and the resin layer 120 can be enhanced.

Furthermore, according to this embodiment, since coating is performed by the screen printing method, slurry having silver particles 123 dispersed therein can be simply coated on the resin layer 120.

Still furthermore, according to this embodiment, the thickness t2 of the silver coating layer 121 is set in the range between 1 μm and 20 μm, whereby the piston 101 having the sliding face 122 which is reduced in friction by the silver coating layer 121 can be formed with an inexpensive construction.

Third Embodiment

In the third embodiment, this embodiment has the same construction as the piston 101 according to the second embodiment in that the intermixture layer 126 is interposed between the resin layer (undercoat layer) 120 and the silver coating layer (solid lubricating layer) 121. However, this embodiment is different in the procedure of forming the intermixture layer 126, and thus the procedure of forming the intermixture layer 126 will be described.

The third embodiment is different from the second embodiment in that terpineol as alcohol-based solvent is used as polar solvent for dispersing silver particles 123, but the third embodiment has the same construction except for the above matter.

This embodiment uses terpineol, but the solvent is not limited to terpineol. Nonanol or ethylene glycol such as the same type alcohol-based solvent, PGMEA (propylene Glycol monomethyl ether acetate) such as aqueous solvent or methyl-ethyl ketone as ketone-based solvent may be used.

Normally, there can be simply formed a piston in which the resin layer is provided between the main body and the silver coating layer, the main body and the silver coating layer are joined to each other by the resin layer to enhance the adhesion between the main body and the silver coating layer is enhanced and the silver coating having excellent mechanical strength is provided.

Here, the piston is used under a harsh environment, for example, it is used in a cylinder bore of an engine. Therefore, the adhesion of the silver coating layer is required to be higher, and the applicant has sought a manufacturing process for more greatly enhancing the adhesion between the main body and the silver coating layer.

As a result of applicant's repetitive experiments, it has been found that the adhesion strength between the silver coating layer 121 and the resin layer 120 is higher in a process (2) of coating slurry having silver particles dispersed therein on unhardened (liquid) resin material and heating the slurry and the resin material than that in a process (1) of coating slurry on the outer peripheral surface of a hardened resin layer and heating the slurry to form a silver coating layer on the outer peripheral surface of the resin layer.

Figure 20:
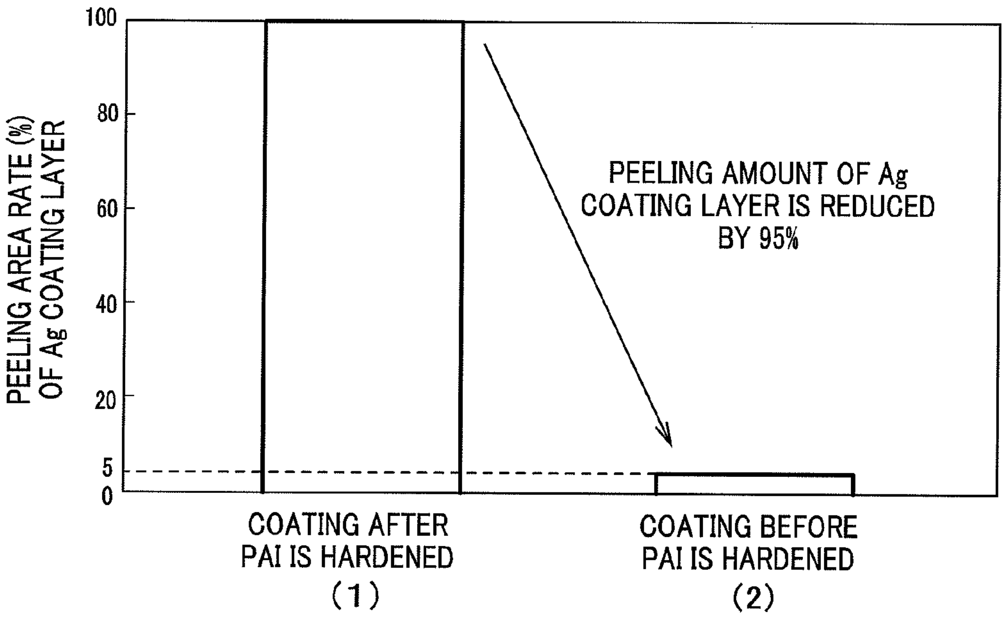
FIG. 20 is a graph showing a comparison result of the peeled area rate of the silver coating layer when slurry is coated before and after resin material is hardened.

FIG. 20 is graph showing a comparison result in peeling area rate of the silver coating layer 121 when the slurry is coated before and after the resin material is hardened. The peeling area rate is defined as follows. A tape peeling test of attaching an adhesive tape to the main body 110 coated with silver coating and then exfoliating the tape from the main body 110 is conducted. At this time, the peeling area rate is defined as the rate of the area of the silver coating exfoliating from the main body 110 and adhering to the adhesive surface of the tape to the area of the adhesive surface of the tape.

In this embodiment, the peeling area rate of the silver coating layer 121 is determined by conducting the tape peeling test after a tumbling test and determining the area of the silver coating which exfoliates from the main body and adhering the adhesive surface of the tape. The tumbling test is the following test. Steel balls which have diameters of 2 to 5 mm and have a total weight of several kg and an estimation workpiece (here, a main body 110 coated with silver coating) are put in a cylindrical container, and the cylindrical container is rotated at 50 to 10 rpm for 20 to 30 minutes, whereby the steel balls are made to impinge against the surface of the workpiece and the silver coating is intentionally damaged.

According to FIG. 20, (1) when the peeling area rate of the silver coating layer manufactured in the process of coating slurry after resin material (PAI) is hardened is set to 100%, it has been found as a result that (2) the peeling area rate of the silver coating layer 121 manufactured in the process of coating slurry before resin material is hardened is equal to 5%, and thus the peeling amount is reduced by 95%.

Polyamide imide resin either solves in terpineol, nor chemically reacts with terpineol. However, it is estimated that when slurry having silver particles 123 dispersed therein is coated on unhardened (liquid) polyamide imide resin, a intermixture layer 126 (FIG. 13) in which slurry and polyamide imide resin 124 are intermixed with each other is formed at the interface 130 between the polyamide imide resin 124 and the slurry due to Brownian motion of the silver particles 123 or the difference in specific gravity between terpineol and the polyamide imide resin 124.

Therefore, the slurry having the silver particles 123 dispersed therein is coated on the unhardened (liquid) resin material, and the slurry and the resin material are heated, whereby the resin material and silver intricately interlock with each other in the intermixture layer 126, whereby the so-called anchor effect exerts and the adhesion between the silver coating layer 121 and the resin layer 120 can be enhanced.

According to this embodiment, in a method of manufacturing a piston 101 by forming silver coating on the outer peripheral surface 111 of a main body 110 formed of aluminum alloy to form a sliding face 122, polyamide imide resin 124 having a thermosetting property is coated on the outer peripheral surface 111 of the main body 110, slurry having silver particles 123 dispersed in terpineol is coated on the polyamide imide resin 124 before the polyamide imide resin 124 is hardened, and the coated slurry, the polyamide imide resin 124 and the main body 110 are heated so that the polyamide imide resin 124 is hardened, terpineol is removed and the silver particles 123 are fused and welded to one another on the surface of the polyamide imide resin 124 to form the sliding face 122. Therefore, the silver coating layer 121 and the main body 110 which constitute the sliding face 122 are joined to each other through the resin layer 120 obtained by hardening the polyamide imide resin 124. Therefore, no harmful material is used in the manufacturing process, the adhesion stress between the main body 110 and the silver coating layer 121 can be enhanced, and the piston 101 to which the silver coating layer 121 having excellent mechanical strength is applied can be readily formed.

Furthermore, according to this embodiment, slurry is coated on unhardened polyamide imide resin 124 under liquid state, whereby the intermixture layer 126 in which silver and polyamide imide resin are intermixed with each other is formed at the interface between the polyamide imide resin 124 and the slurry, and the silver coating layer 121 and the resin layer 120 are made to closely adhere to each other by the intermixture layer 126. Therefore, the adhesion strength between the silver coating layer 121 and the resin layer 120 can be enhanced. Furthermore, the slurry is coated on the liquid polyamide imide resin 124 and they are heated, whereby the step of forming the resin layer 120 by hardening polyamide imide resin 124 and the step of forming the silver coating layer 121 on the outer peripheral surface 120A of the resin layer 120 can be implemented by a single step. Therefore, the number of process steps and the manufacturing time can be reduced.

Fourth Embodiment

In the fourth embodiment, the intermixture layer 126 is more solidly formed. The fourth embodiment is different from the second embodiment in that terpineol as alcohol-based solvent is used as polar solvent for dispersing silver particles 123 as in the case of the third embodiment, and is the same as the second embodiment in the other constructions.

As described above, the intermixture layer 126 is formed at the interface 130 between the polyamide imide resin 124 and the slurry by coating the slurry on the unhardened (liquid) polyamide imide resin, and the polyamide imide resin 124 and silver are intricately interlock with each other in the intermixture layer 126, whereby the so-called anchor effect exerts and the adhesion between the silver coating layer and the resin layer 120 is enhanced.

Figure 21:
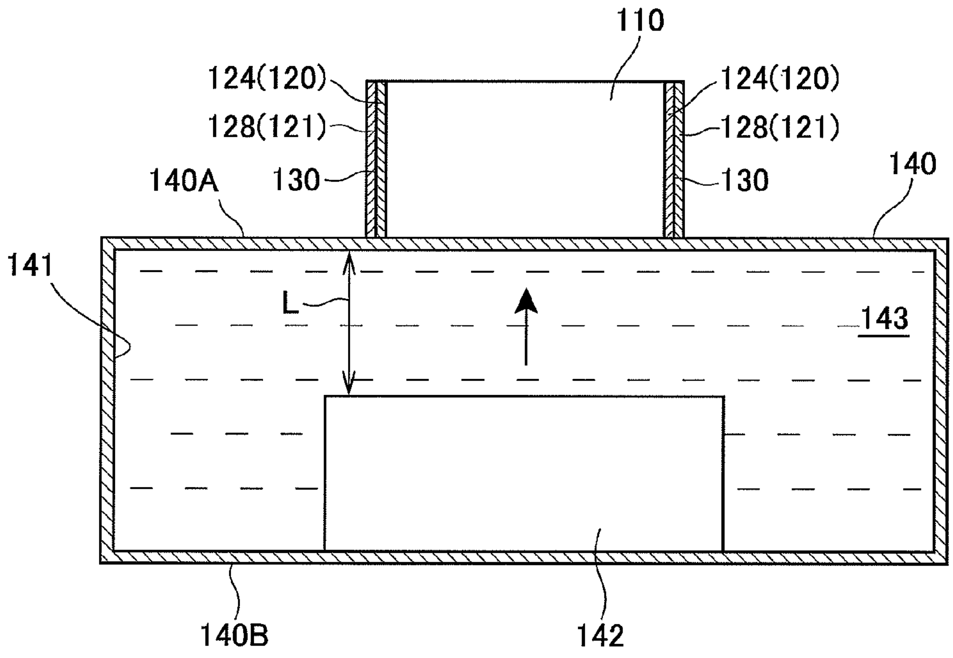
FIG. 21 shows an example of an ultrasonic vibration apparatus for applying ultrasonic vibration to polyamide imide resin and slurry to form a intermixture layer at the interface.

The applicant has expected that the intermixture layer 126 having higher adhesiveness could be more stably and early formed by applying external force to the polyamide imide resin 124 and the slurry so that polyamide resin 124 and the slurry are further intermixed with each other at the interface 130, and has found a process of coating slurry on unhardened (liquid) polyamide imide resin and then applying ultrasonic vibration to the polyamide imide resin and the slurry FIG. 21 shows an example of an ultrasonic vibrating apparatus for applying ultrasonic vibration to polyamide imide resin and slurry to form a intermixture layer 12 at the interface therebetween.

The ultrasonic vibrating apparatus 145 has a water tank 140 formed of plastic, glass or the like, and an ultrasonic generator 142 disposed in the water tank 140. The water tank 140 has a top plate 140A, and water (liquid) 143 is filled from the bottom plate 140B to the top plate 140A in the internal space 141 of the water tank 140. A main body 110 having unhardened (liquid) polyamide imide resin 124 and slurry 128 coated on the unhardened polyamide imide resin 124 is disposed on the top plate 140A. In this case, the lower surface of the main body 110 serves as a contact face with the top plate 140A, and thus the polyamide imide resin 124 and the slurry 128 are not coated on the lower surface.

Furthermore, the ultrasonic generator 142 is disposed on the bottom plate 140B of the water tank 140 so as to be spaced from the top plate 140A at a predetermined interval L. The ultrasonic generator 142 is configured to output ultrasonic wave while changing the frequency of the ultrasonic wave in a predetermined frequency range, and the output ultrasonic wave is transmitted through water 143 in the water tank 140 and the top plate 140A to the main body 110.

In this embodiment, the water temperature in the water tank 140 is set to 20° C. to 65° C., and ultrasonic wave is applied to the main body 110 for 3 minutes while the output power of the ultrasonic generator 142 is set to 900 W and the frequency is set to 35 kHz.

The ultrasonic vibration applied to the main body 110 is transmitted from the main body 110 to the polyamide imide resin 124 and the slurry 128, whereby the polyamide imide resin 124 and the slurry 128 are moved at the interface 130 therebetween by the transmitted ultrasonic vibration, thereby forming the intermixture layer 126 (FIG. 13) in which the polyamide imide resin 124 and the slurry 128 are intermixed with each other.

Figure 22:
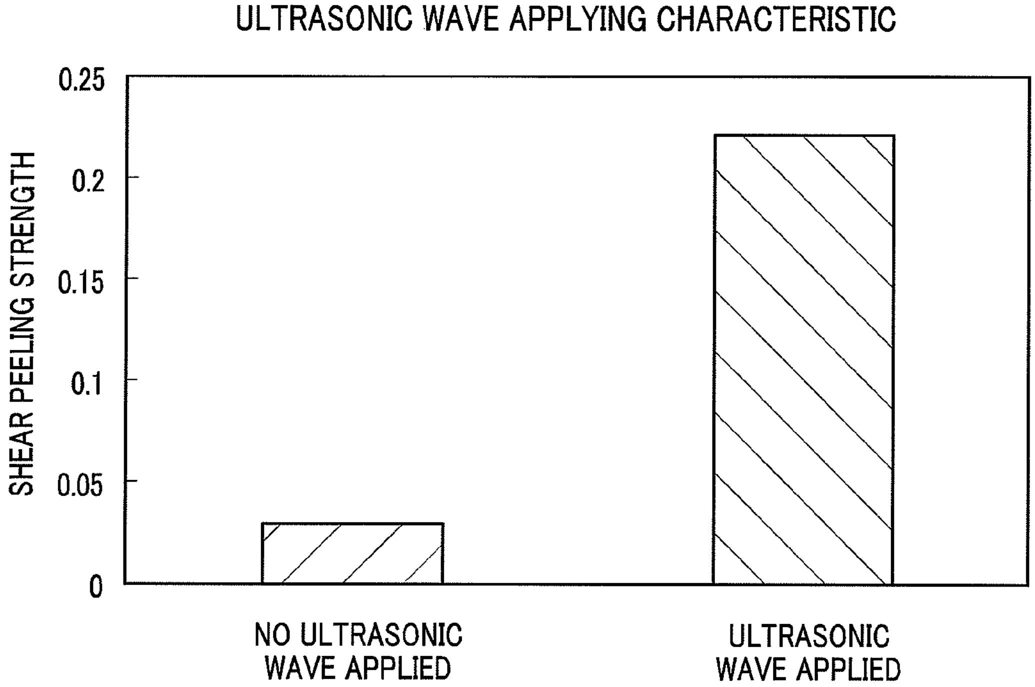
FIG. 22 is a graph showing a comparison result of the shear peel-strength between a piston formed by applying no ultrasonic vibration and a piston formed by applying ultrasonic vibration.

FIG. 22 is a graph showing a comparison result of shear peeling strength between a piston formed by applying ultrasonic vibration and a piston formed by applying no ultrasonic vibration.

The shear peeling strength corresponds to a numerical value with which the adhesion strength between the coating and the base member is represented by an SAICAS (Surface And Interfacial Cutting Analysis System) test machine.

From FIG. 22, the value of the shear peeling strength which is equal to 0.03N/m in the piston to which no ultrasonic vibration is applied is increased to 0.22N/m by applying ultrasonic vibration, that is, the value of the shear peeling strength of the piston to which the ultrasonic vibration is applied is about seven times as large as the piston to which no ultrasonic vibration is applied.

It is estimated as the reason for this that the polyamide imide resin 124 and the slurry 128 are positively intermixed with each other at the interface 130 therebetween by applying ultrasonic vibration to the polyamide imide resin 124 and the slurry 128, so that a intermixture layer 126 (FIG. 13) having a larger thickness than that to which no ultrasonic vibration is applied is formed.

Furthermore, in this embodiment, the ultrasonic vibration is transmitted through the main body 110 to the polyamide imide resin 124 and the slurry 128. Therefore, substantially uniform vibration can be applied to the interface 130 between the polyamide imide resin 124 and the slurry 128. Therefore, the thickness of the intermixture layer 126 formed at the interface 130 can be adjusted to be substantially uniform. Accordingly, the piston 101 in which the joint strength between the silver coating layer 121 and the resin layer 120 is substantially uniform can be formed.

According to this embodiment, the slurry is coated on the pre-hardening polyamide imide resin 124 under liquid state, the ultrasonic vibration is applied to the coated slurry 128 and the polyamide imide resin 124, whereby the intermixture layer 126 in which the polyamide imide resin 124 and the slurry 128 are positively intermixed with each other is formed at the interface 130 between the polyamide imide resin 124 and the slurry 128, and the silver coating layer 121 and the resin layer 120 closely adhere to each other by the intermixture layer 126, so that the joint strength between the silver coating layer 121 and the resin layer 120 can be enhanced.

This embodiment has been described along the process of applying ultrasonic vibration to the polyamide imide resin 124 and the slurry 128 and then heating the slurry 128, the polyamide imide resin 124 and the main body 110. However, if ultrasonic vibration can be applied while heating is performed in a heating furnace, the process of heating the slurry 128, the polyamide imide resin 124 and the main body 110 while applying ultrasonic vibration to the polyamide imide resin 124 and the slurry 128 may be adopted. In this case, the number of process steps and the process time can be further reduced.

Fifth Embodiment

In a fifth embodiment, in place of ultrasonic vibration, vibration is directly applied to unhardened (liquid) polyamide imide resin and slurry to form a intermixture layer 126 at the interface 130 therebetween. The fifth embodiment is also different from the second embodiment in the construction that terpineol as alcohol-based solvent is used as polar solvent for dispersing silver particles 123 as in the case of the third embodiment, and the other constructions thereof are the same as the second embodiment.

Figure 23:
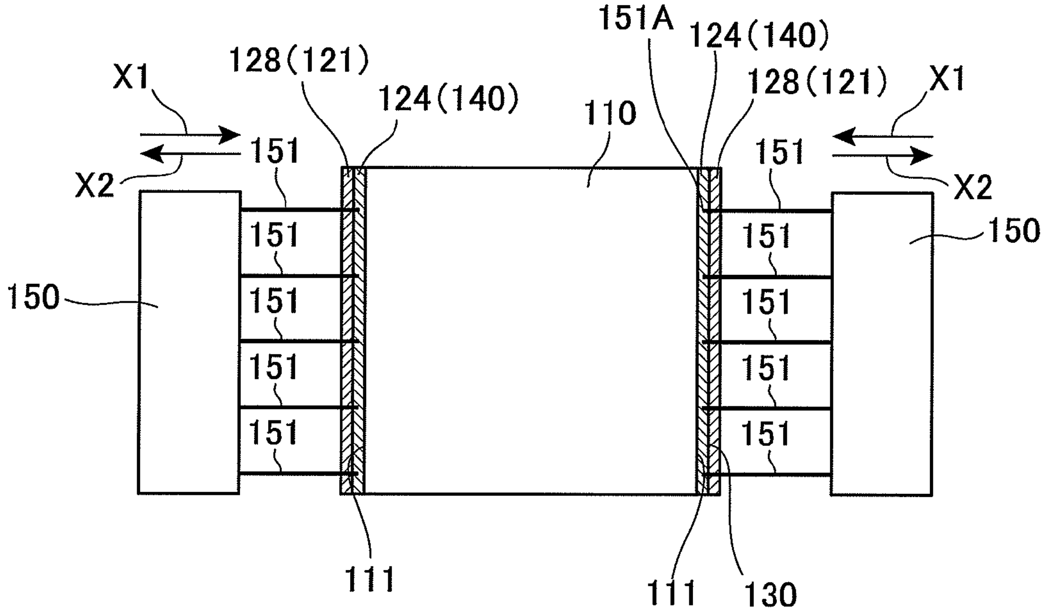
FIG. 23 shows an example of a vibrating apparatus for applying vibration to polyamide-imide resin and slurry to form a intermixture layer at the interface.

FIG. 23 shows an example of a vibrating device for applying vibration to polyamide imide resin and slurry to form a intermixture layer 126 at the interface therebetween.

The vibrating device 155 has a vibrator 150, plural needle-like wire rods (vibrating bodies) 151, 151, . . . which are joined to the vibrator 150, and a moving mechanism (not shown) for moving the vibrator 150 in an approaching direction (X1 in FIG. 23) to the main body 110 or in a receding direction (X2 in FIG. 23) from the main body 110. The main body 110 is mounted on a stage (not shown) while unhardened (liquid) polyamide imide resin 124 and slurry 128 are coated on the outer peripheral surface 111 of the main body 110, and the vibrator 150 is disposed so that the tips 151A of the wire rods 151 face the main body 110.

The vibrator 150 has a weight which is eccentrically provided to the rotating shaft of an electrically-driven motor in a case, and the weight is eccentrically rotated to generate vibration. The wire rods 151 are needle-like members which are designed to have a predetermined wire diameter (for example, 0.5 mm). In this embodiment, the wire rods 151 are secured to the case body so as to be spaced from one another at a predetermined pitch (for example, 12 mm).

When the vibrator 110 is moved in the approaching direction (X1 in FIG. 23) to the main body coated with the polyamide imide resin 124 and the slurry 128, the wire rods 151 stick into the slurry 128 and the polyamide imide resin 124. In this case, it is desired that the tips 151A of the wire rods 151 are located in the polyamide imide resin 124 and do not come into contact with the outer peripheral surface 111 of the main body 110. When the tips 151A comes into contact with the outer peripheral surface 111, the tips 151A serve as fixed ends upon transmission of vibration to the wire rods 151, so that the amplitude of the tips 151A lessens.

Subsequently, the vibrator 150 is actuated under the state that the wire rods 151 are inserted into the slurry 128 and the polyamide imide resin 124. At this time, the vibration of the vibrator 150 is transmitted through the wire rods 151 to the polyamide imide resin 124 and the slurry 128. In this embodiment, the vibrator 150 is controlled to be actuated for 3 minutes while the vibration power of the electrically-driven motor is set to 50 W and the frequency is set to 30 Hz.

Accordingly, the unhardened polyamide imide resin 124 and the slurry 128 are shaken at the interface 130 therebetween by the operation of the wire rods 151, and also the polyamide imide resin 124 and the slurry 128 are moved and intermixed with each other, whereby the intermixture layer 126 (FIG. 13) is formed.

In this embodiment, the two vibrating devices 155 are provided so as to sandwich the main body 110 therebetween, and the stage (not shown) on which the main body 110 is mounted is rotated every predetermined angle, whereby the intermixture layer 126 is formed over the whole periphery of the main body 110. Only one vibrating device 155 may be provided, or plural vibrating devices 155 may be arranged around the main body 110.

Figure 24:
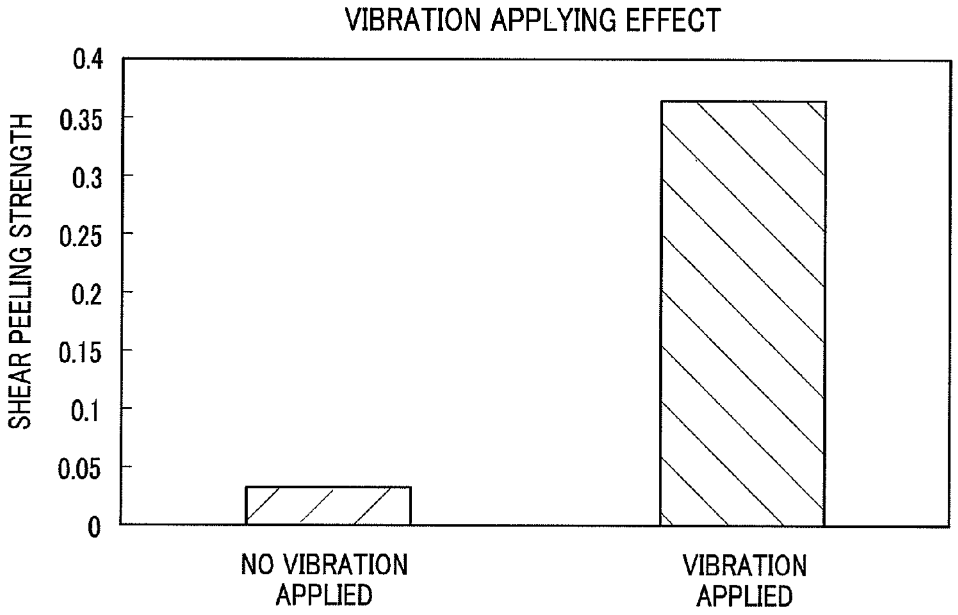
FIG. 24 is a graph showing a comparison result of the share peel-strength between a piston formed by applying no vibration and a piston formed by applying vibration.

FIG. 24 is a graph showing a comparison result of shear peeling strength between a piston formed by applying no vibration and a piston formed by applying vibration.

The shear peeling strength corresponds to a numerical value with which the adhesion strength between the coating and the base member is represented by an SAICAS (Surface And Interfacial Cutting Analysis System) test machine.

From FIG. 24, the value of the shear peeling strength which is equal to 0.03N/m in the piston to which no vibration is applied is increased to 0.36N/m by applying vibration, that is, the value of the shear peeling strength of the piston to which the vibration is applied is about 12 times as large as the piston to which no vibration is applied.

It is estimated as the reason for this that the polyamide imide resin 124 and the slurry 128 are positively intermixed with each other at the interface 130 therebetween by applying vibration to the polyamide imide resin 124 and the slurry 128, so that the intermixture layer 126 (FIG. 13) having a larger thickness than that to which no vibration is applied is formed.

Furthermore, in this embodiment, the wire rods 151 are vibrated while directly stick into the slurry 128 and the polyamide imide resin 124, the slurry 128 and the polyamide imide resin 124 are more greatly intermixed with each other as they are nearer to the wire rods 151, whereby the intermixture layer having higher joint strength can be partially formed. Therefore, by adjusting the position of the wire rods 151, the joint strength between the silver coating layer 121 and the resin layer 120 can be enhanced in a pinpoint.

According to this embodiment, the slurry is coated on the unhardened liquid polyamide imide resin 124, the wire rods 151 are inserted into the coated slurry 128 and the polyamide imide resin 124, and vibration is applied to the slurry 128 and the polyamide imide resin 124, whereby the intermixture layer 120 in which the polyamide imide resin 124 and the slurry 128 are positively intermixed with each other is formed at the interface 130 between the polyamide imide resin 124 and the slurry 128. The silver coating layer 121 and the resin layer 120 closely adhere to each other by the intermixture layer 126, so that the adhesion strength between the silver coating layer and the resin layer 120 can be enhanced.

In this embodiment, the vibrating device 155 as a construction for applying vibration to the polyamide imide resin 124 and the slurry 128 has been described as an example. However, another construction may be used insofar as it applies vibration to the polyamide imide resin 124 and the slurry 128.

The procedure of forming the intermixture layer 126 described with reference to the third to fifth embodiments may be used for the piston 10 according to the first embodiment.

Sixth Embodiment

Figure 25:
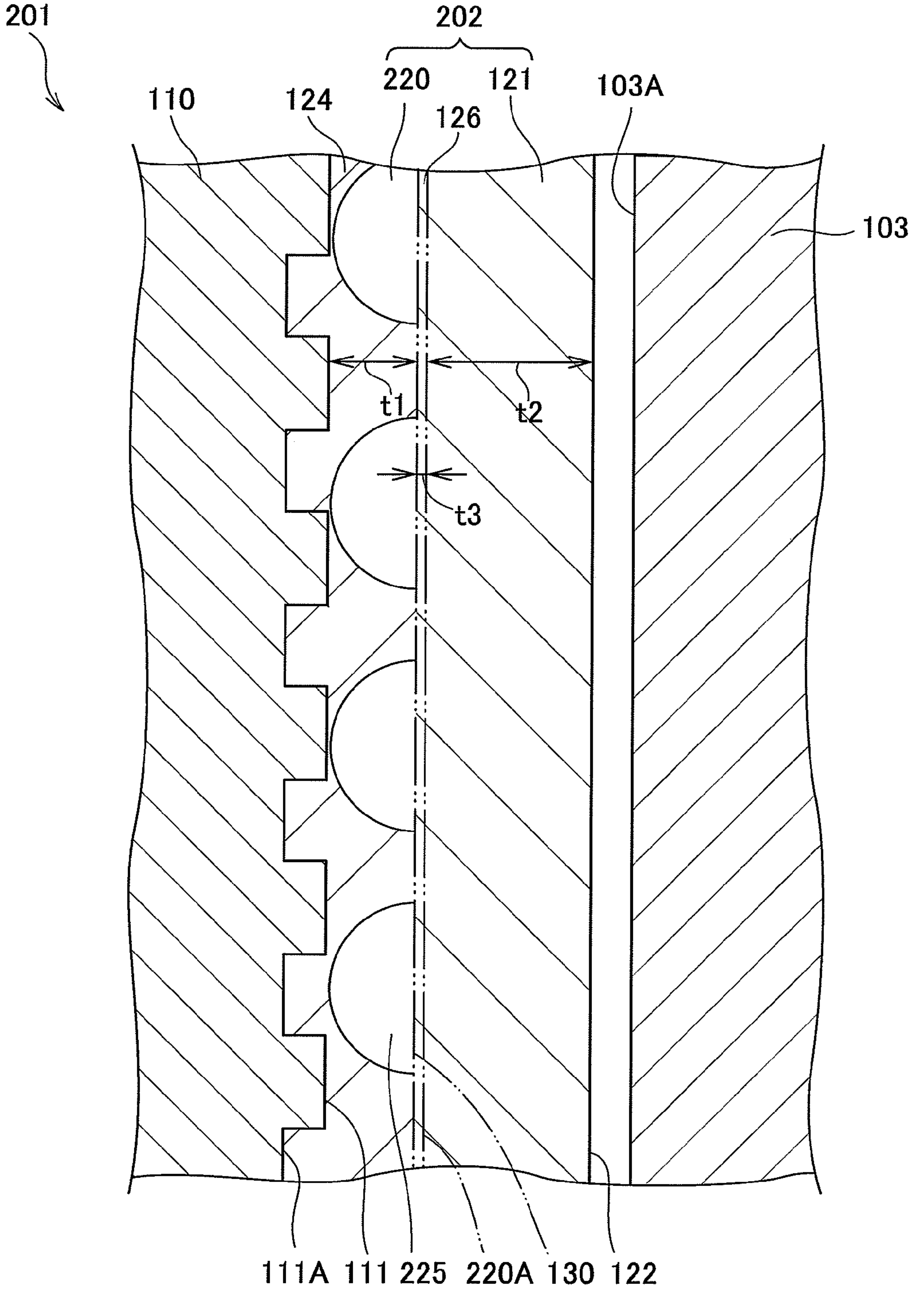
FIG. 25 is a side cross-sectional view showing a coating layer of a piston according to a sixth embodiment.

FIG. 25 is a side cross-sectional view showing a coating layer 202 of a piston 201 according to a sixth embodiment. In this embodiment, a resin layer 220 is configured so that silver particles 225 whose average particle diameter is set to a predetermined average particle diameter (1 μm to 30 μm) are mixed in polyamide imide resin 124, and the other constructions of this embodiment are the same as the second to fifth embodiments. The same constructions are represented by the same reference numerals, and the description thereof is omitted. In this construction, the maximum value of the average particle diameter of the silver particles 225 is set to be larger than the thickness t1 of the resin layer 220. The silver particles 225 protrude from the outer peripheral surface 220A of the resin layer 220. Therefore, in the process of forming the silver coating layer 121, the silver particles 225 are fused and welded to the silver coating layer 121, and function to enhance the adhesiveness between the silver coating layer 121 and the resin layer 220 more greatly.

In this embodiment, the silver coating layer 121 is provided to the outside of the resin layer 220, and the silver particles 225 which are the same metal as the silver coating layer 121 are mixed in the polyamide imide resin 124. However, copper particles may be mixed in polyamide imide resin insofar as a copper coating layer is provided to the outside of the resin layer.

Figure 26:
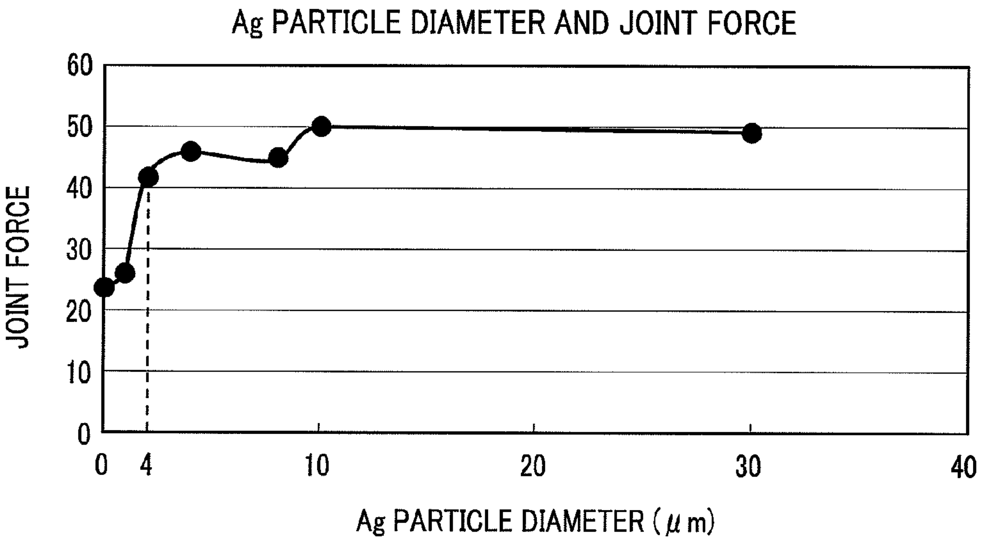
FIG. 26 is a graph showing the relationship between the particle diameter of silver particles in a resin layer and the adhesion between a silver coating layer and a resin layer.
Figure 27:
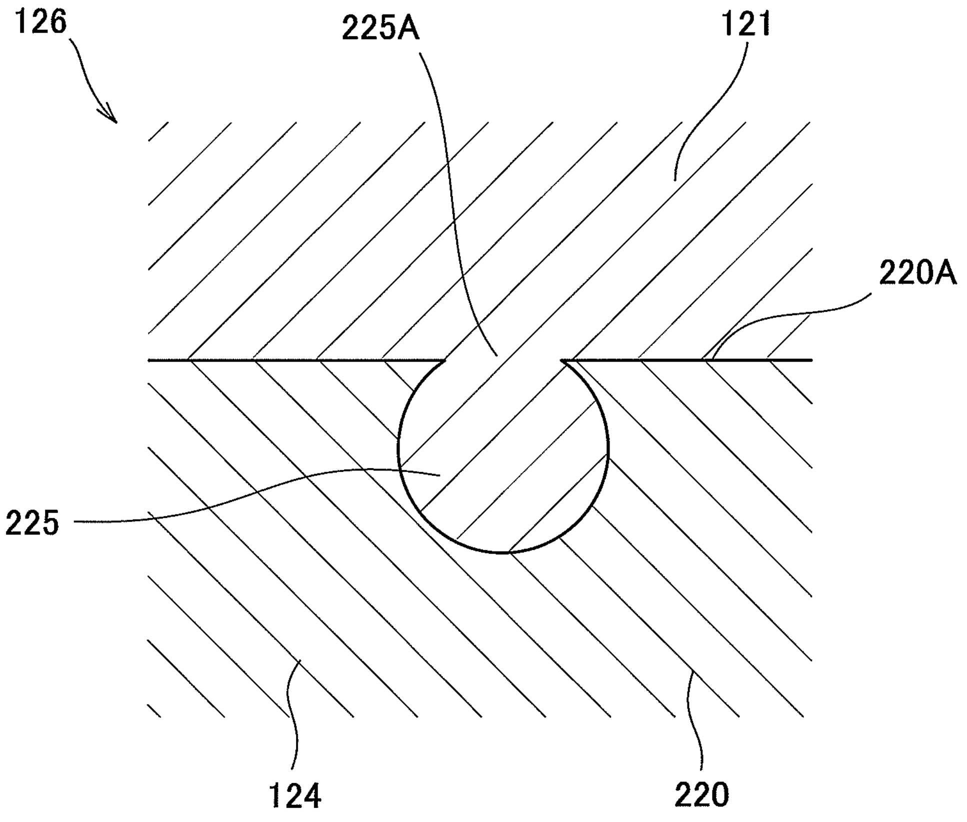
FIG. 27 is a schematic cross-sectional view showing a state that the silver particles in the resin layer are fused with the silver coating layer.

FIG. 26 is a graph showing the relationship between the particle diameter of the silver particles 225 in the resin layer 220 and the adhesion strength between the silver coating layer 121 and the resin layer 220. FIG. 27 is a cross-sectional view showing the state that the silver particle 225 in the resin layer 220 and the silver coating layer 121 are fused and welded to each other in the intermixture layer 126.

The joint strength between the silver coating layer 121 and the resin layer 220 is measured by using a scratch test method as follows. A contact core is pressed against coating under a constant load, and force with which peeling occurs is measured on the basis of the displacement of the contact core when the contact core is vertically moved from the tip of the contact core under the state that the core penetrates through the coating, and the joint strength is measured on the basis of the measured force.

As described above, the silver coating layer 121 and the resin layer 220 firmly adhere to each other by the intermixture layer 126 between the silver coating layer 121 and the resin layer 220, and the silver particles 225 in the resin layer 220 are fused and welded to the silver particles 123 in the slurry when the silver coating layer 121 is formed, whereby the silver particles 225 closely adhere to the silver particles 123. Specifically, as shown in FIG. 27, the silver particle 225 exposed to the outer peripheral surface 220A of the resin layer 220 is fused and welded to the silver coating layer 121 (the silver particle 123 forming the silver coating layer 121) at the exposed surface 225A, whereby the silver coating layer 121 and the resin layer 220 closely adhere to each other. Here, in this embodiment, the average particle diameter of the silver particles 225 contained in the resin layer 220 is set in the range from 4 μm to 30 μm. When the average particle diameter of the silver particles 225 in the resin layer 220 is smaller than 4 μm, the contact area between the silver particle 225 and the silver particle 123 forming the silver coating layer 121 is reduced, and thus the joint force between the resin layer 220 and the silver coating layer 121 is reduced. On the other hand, when the average particle diameter of the silver particles 225 in the resin layer 220 is larger than 30 μm, the silver particles 225 are difficult to be dispersed in the resin layer 220. Therefore, in this embodiment, the average particle diameter of the silver particles 225 in the resin layer 220 is set in the range from 4 μm to 30 μm, whereby the joint force between the silver particles 225 in the resin layer 220 and the silver coating layer 121 can be enhanced.

Here, when the average particle diameter of the silver particles 225 is set to 30 μm, the silver particles 225 protrude from the sliding face 122 of the silver coating layer 121 formed on the outer peripheral surface 220A of the resin layer 220. In this case, this protruding portion comes into sliding contact with the inner wall 103A of the cylinder bore 103 under the initial motion and thus worn out (initially worn out). Therefore, the sliding face 122 is formed as a face from which friction with the inner wall 103A is reduced.

According to this embodiment, the silver particles 225 are dispersed in the resin layer 220, so that not only the silver coating layer 121 and the resin layer 220 firmly adhere to each other through the intermixture layer 126, but also the silver particles 225 in the resin layer 220 are fused and welded to the sliver particles 123 in the slurry. Therefore, the joint force between the silver coating layer 121 and the resin layer 220 can be more greatly enhanced. Furthermore, according to this embodiment, the average particle diameter of the silver particles 225 in the resin layer 220 is set in the range from 4 μm to 30 μm, whereby the joint force between, the silver particles 225 in the resin layer 220 and the silver coating layer 121 can be enhanced.

The present invention is not limited to the above embodiments, and various constructions may be adopted without departing from the subject matter of the present invention. For example, in this embodiment, the main body 110 of the piston 101 is formed of aluminum alloy. However, the main body 110 may be formed of aluminum metal.

Furthermore, in the embodiments, the solid lubricating portion (silver coating layer) 26, 121 is formed on the piston skirt (skirt portion) 12, 110B of the piston 10, 101 as the sliding member. However, the present invention is not limited to the embodiments. The solid lubricating portion (silver coating layer 26, 121 may be formed on the sliding face of a bearing metal, a camshaft or the like.

DESCRIPTION OF REFERENCE NUMERALS

10, 101, 201 piston (sliding member)
24 undercoat layer
26 solid lubricating portion
28 eroded layer (intermixture layer)
102, 202 coating layer
103 cylinder bore (sliding target member)
110 main body (base member)
111 outer peripheral surface (surface)
120, 220 resin layer (undercoat layer)
121 silver coating layer (fixed lubricating portion)
122 sliding face
123 silver particles
126 intermixture layer

The invention claimed is:

1. A sliding member having a sliding face that slides in a sliding target member, wherein an undercoat layer containing a resin material is provided on the surface of a base member, a solid lubricating portion that is formed on the undercoat layer and constitutes the sliding face from at least one kind of material selected from the group consisting of silver, silver alloy, copper and copper alloy is provided, and an intermixture layer in which both the undercoat layer and the solid lubricating portion are intermixed with each other is interposed between the undercoat layer and the solid lubricating portion, wherein the porosity of the solid lubricating portion is equal to 2% or less, and the thickness of the intermixture layer is equal to 10 nm or more.

2. The sliding member according to claim 1, wherein the undercoat layer further contains solid lubrication agent, and the blending ratio of the resin material and the solid lubrication agent is set in the range from 1:9 to 9:1 in wt %.

3. The sliding member according to claim 2, wherein the solid lubrication agent is at least one kind of material selected from the group consisting of molybdenum disulfide, boron nitride and graphite.

4. The sliding member according to claim 1, wherein at least the solid lubricating portion is configured in a linear shape or dot-like shape.

5. The sliding member according to claim 1, wherein the solid lubricating portion is formed as a coating layer on the undercoat layer through the intermixture layer.

6. The sliding member according to claim 1, wherein the sliding member is a piston for an internal combustion engine, the piston has a skirt portion whose surface is flat and smooth, and the undercoat layer is formed on the flat and smooth surface.

7. A method of manufacturing the sliding member of claim 1, by forming coating of silver, silver alloy, copper or copper alloy on a surface of a base material to form the sliding face, comprising the steps of:

coating the resin material having a thermosetting property on the surface of the base member, coating on the resin material suspension solution containing fine particles of any one of silver, silver alloy, copper or copper alloy dispersed in polar solvent before the resin material is hardened, and heating the coated suspension solution, the resin material and the base member to harden the resin material, remove the polar solvent and fuse and weld the fine particles to one another on the surface of the resin material.

8. The method of manufacturing the sliding member according to claim 7, wherein before the resin material is hardened, vibration is applied to the coated suspension solution and the resin material so that an intermixture layer in which both the fine particles and the resin material are intermixed with each other is formed between the suspension solution and the resin material.

9. The method of manufacturing the sliding member according to claim 7, wherein ultrasonic vibration is applied to the suspension solution and the resin material.

10. A method of manufacturing the sliding member of claim 1, by forming coating of silver, silver alloy, copper or copper alloy on a surface of a base material to form the sliding face, comprising the steps of:

forming a resin layer on a surface of the base member, coating, on the resin layer, suspension solution in which fine particles of any one of silver, silver alloy, copper and copper alloy are dispersed in solvent for swells a surface of the resin layer, and heating the suspension solution, the resin layer and the base member while an intermixture layer in which the fine particles and the resin material are intermixed with each other is formed between the coated suspension solution and the resin layer, whereby the fine particles in the suspension solution are fused and welded to one another while the solvent is removed, thereby forming the sliding face.

11. The method of manufacturing the sliding member according to claim 7, wherein the average particle diameter of the fine particles of any one of silver, silver alloy, copper and copper alloy to be dispersed in the solvent is set in the range from 1 nm to 80 nm.

12. The method of manufacturing the sliding member according to claim 7, wherein heating temperature for the heating is set in the range from 160° C. to 240° C.

13. The method of manufacturing the sliding member according to claim 7, wherein the same type metal particles as the fine particles dispersed in the solvent are dispersed in the resin material.

14. The method of manufacturing the sliding member according to claim 13, wherein the average particle diameter of the particles dispersed in the resin material is set in the range from 4 μm to 30 μm.

15. The method of manufacturing the sliding member according to claim 10, wherein the average particle diameter of the fine particles of any one of silver, silver alloy, copper and copper alloy to be dispersed in the solvent is set in the range from 1 nm to 80 nm.

16. The method of manufacturing the sliding member according to claim 10, wherein heating temperature for the heating is set in the range from 160° C. to 240° C.

17. The method of manufacturing the sliding member according to claim 10, wherein the same type metal particles as the fine particles dispersed in the solvent are dispersed in the resin material.

18. The method of manufacturing the sliding member according to claim 17, wherein the average particle diameter of the particles dispersed in the resin material is set in the range from 4 μm to 30 μm.

* * * * *